US012057945B2

(12) United States Patent
Hosseini et al.

(10) Patent No.: US 12,057,945 B2
(45) Date of Patent: Aug. 6, 2024

(54) REPETITION-BASED TRANSMISSIONS FOR UPLINK ULTRA-RELIABLE LOW LATENCY COMMUNICATION

(71) Applicant: QUALCOMM Incorporated, San Diego, CA (US)

(72) Inventors: Seyedkianoush Hosseini, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/387,348

(22) Filed: Apr. 17, 2019

(65) Prior Publication Data

US 2019/0327064 A1    Oct. 24, 2019

Related U.S. Application Data

(60) Provisional application No. 62/670,386, filed on May 11, 2018, provisional application No. 62/660,229, filed on Apr. 19, 2018.

(51) Int. Cl.
*H04L 1/1867* (2023.01)
*H04L 1/00* (2006.01)
(Continued)

(52) U.S. Cl.
CPC ............ *H04L 1/189* (2013.01); *H04L 1/0003* (2013.01); *H04L 5/0048* (2013.01);
(Continued)

(58) Field of Classification Search
USPC ......................................................... 370/329
See application file for complete search history.

(56) References Cited

U.S. PATENT DOCUMENTS 10,149,255 B2    12/2018  Patel et al.
10,334,562 B2 *   6/2019  Papasakellariou .... H04W 48/12
(Continued)

FOREIGN PATENT DOCUMENTS

CN    104737485 A    6/2015
CN    105409138 A    3/2016
(Continued)

OTHER PUBLICATIONS

Ericsson: "UL SPS PUSCH Performance and HARQ Ambiguity Resolution", 3GPP Draft; R1-1805163-UL SPS PUSCH Performance and HARQ Ambiguity Resolution AI 6.2.8.2, 3rd Generation Partnership Project (3GPP), Mobile Competence Centre, 650, Route Des Lucioles; F-06921 Sophia-Antipolis Cedex, France, vol. RAN WG1, No. Sanya, China; Apr. 16, 2018-Apr. 20, 2018, Apr. 15, 2018 (Apr. 15, 2018), 6 Pages, XP051427418, Retrieved from the Internet: URL: http://www.3gpp.org/ftp/Meetings_3GPP_SYNC/RAN1/Docs/ [retrieved on Apr. 15, 2018], Section 2.2.
(Continued)

*Primary Examiner* — Jeffrey M Rutkowski
*Assistant Examiner* — Luna Weissberger
(74) *Attorney, Agent, or Firm* — Guang Yu Zhang; Holland & Hart LLP

(57) ABSTRACT

Methods, systems, and devices for wireless communications are described. In some wireless communications systems, a user equipment (UE) may be configured to transmit a transport block multiple times in a set of transmission time intervals (TTIs) of a repetition window to improve the chances that the transport block is received by a receiving device. In some cases, however, the transport block may not be available to be transmitted in the repetition window until after a first TTI of the repetition window. In such cases, the UE may use the techniques described herein to identify appropriate configurations for transmitting the transport (Continued)

block in the repetition window. In particular, the UE may determine whether to use a fixed repetition window or a sliding repetition window for transmitting the transport block based on various factors in an attempt to satisfy latency and reliability constraints associated with the transport block.

42 Claims, 21 Drawing Sheets

(51) Int. Cl.
  *H04L 5/00* (2006.01)
  *H04L 27/26* (2006.01)
(52) U.S. Cl.
  CPC .......... *H04L 5/0051* (2013.01); *H04L 5/0082* (2013.01); *H04L 27/2602* (2013.01); *H04L 27/2607* (2013.01)

(56) References Cited

U.S. PATENT DOCUMENTS

| | | | |
|---|---|---|---|
| 2014/0092731 A1 | 4/2014 | Gupta et al. | |
| 2015/0085717 A1* | 3/2015 | Papasakellariou | H04L 5/14 370/280 |
| 2015/0098371 A1 | 4/2015 | Vajapeyam et al. | |
| 2015/0237644 A1 | 8/2015 | Golitschek et al. | |
| 2015/0245323 A1 | 8/2015 | You et al. | |
| 2015/0249971 A1 | 9/2015 | Yu | |
| 2016/0073402 A1 | 3/2016 | Eriksson et al. | |
| 2016/0135170 A1 | 5/2016 | Chen et al. | |
| 2016/0143017 A1 | 5/2016 | Yang et al. | |
| 2016/0269146 A1* | 9/2016 | Sun | H04L 1/20 |
| 2016/0295609 A1* | 10/2016 | Vajapeyam | H04L 5/14 |
| 2017/0019886 A1 | 1/2017 | Patel et al. | |
| 2017/0289995 A1* | 10/2017 | Lin | H04W 72/23 |
| 2018/0115387 A1* | 4/2018 | Takeda | H04L 1/0003 |
| 2019/0174327 A1* | 6/2019 | You | H04W 4/70 |
| 2019/0230630 A1* | 7/2019 | Mu | H04W 72/0466 |
| 2019/0230689 A1* | 7/2019 | Cao | H04L 27/2602 |
| 2019/0306667 A1* | 10/2019 | Kim | H04B 17/27 |

FOREIGN PATENT DOCUMENTS

| | | |
|---|---|---|
| CN | 107852302 A | 3/2018 |
| JP | 2019525670 A | 9/2019 |
| WO | WO-2016119232 A1 | 8/2016 |
| WO | WO-2016178760 | 11/2016 |
| WO | WO-2017011079 A1 | 1/2017 |
| WO | WO-2018033112 A1 | 2/2018 |

OTHER PUBLICATIONS

Huawei, et al., "Reliability Enhancement for Grant-Free Transmission", 3GPP Draft; R1-1804296, 3rd Generation Partnership Project (3GPP), Mobile Competence Centre, 650, Route Des Lucioles; F-06921 Sophia-Antipolis Cedex, France, vol. RAN WG1, No. Sanya, China; Apr. 1, 2018-Apr. 20, 2018, Apr. 15, 2018 (Apr. 15, 2018), 6 Pages, XP051426584, Retrieved from the Internet: URL: http://www.3gpp.org/ftp/Meetings_3GPP_SYNC/RAN1/Docs/ [retrieved on Apr. 15, 2018], Section 3-Section 4.
International Search Report and Written Opinion—PCT/US2019/028154—ISA/EPO—Jul. 23, 2019.
Samsung: "Discussion on Repetition for UL SPS", 3GPP Draft; R1-1804342, 3rd Generation Partnership Project (3GPP), Mobile Competence Centre, 650, Route Des Lucioles; F-06921 Sophia-Antipolis Cedex, France, vol. RAN WG1, No. Sanya, China; Apr. 16, 2018-Apr. 20, 2018, Apr. 15, 2018 (Apr. 15, 2018), pp. 1-6, XP051426628, Retrieved from the Internet: URL: http://www.3gpp.org/ftp/Meetings_3GPP_SYNC/RAN1/Docs/ [retrieved on Apr. 15, 2018], Section 2.
ZTE et al., "On UL SPS Repetition for LTE URLLC ", 3GPP Draft; R1-1803963 On UL SPS Repetition for LTE URLLC, 3rd Generation Partnership Project (3GPP), Mobile Competence Centre, 650, Route Des Lucioles; F-06921 Sophia-Antipolis Cedex, France, vol. RAN WG1, No. Sanya, China; Apr. 16, 2018-Apr. 20, 2018, Apr. 15, 2018 (Apr. 15, 2018), pp. 1-4, XP051426252, Retrieved from the Internet: URL: http://www.3gpp.org/ftp/Meetings_3GPP_SYNC/RAN1/Docs/ [retrieved on Apr. 15, 2018], Section 2.2.
Taiwan Search Report—TW108113582—TIPO—Jun. 10, 2022.
Ericsson: "Output of LTE URLLC Offline Discussion", 3GPP TSG RAN WG1 Meeting #92, R1-1803165, [searched on Mar. 10, 2023], Athens, Greece, Feb. 26-Mar. 2, 2018, 4 Pages, Mar. 5, 2018.
Ericsson: "URLLC Techniques for PUSCH", 3GPP TSG-RAN WG1 Meeting #92, R1-1802881, [searched on Mar. 10, 2023], Athens, Greece, Feb. 26-Mar. 2, 2018, 14 Pages, Feb. 16, 2018.
Qualcomm Incorporated: "Uplink Enhancements for URLLC", 3GPP TSG RAN WG1 #92b, R1-1804934, No. Sanya, P.R. China, Apr. 16, 2018-Apr. 20, 2018, 3 Pages, Apr. 7, 2018, Apr. 7, 2018.
SAMSUNG: "Discussion on Repetition for UL SPS", 3GPP TSG RAN WG1 Meeting #92bis, R1-1804342, Sanya, China, Apr. 16-20, 2018, pp. 1-6.
ZTE, et al., "On UL SPS Repetition for LTE URLLC", 3GPP TSG RAN WG1 Meeting #92bis, R1-1803963, Sanya, China, Apr. 16-20, 2018, pp. 1-4.

* cited by examiner

REPETITION-BASED TRANSMISSIONS FOR UPLINK ULTRA-RELIABLE LOW LATENCY COMMUNICATION

CROSS REFERENCES

The present application for patent claims the benefit of U.S. Provisional Patent Application No. 62/660,229 by Hosseini, entitled "REPETITION-BASED TRANSMISSIONS FOR UPLINK ULTRA-RELIABLE LOW LATENCY COMMUNICATION," filed Apr. 19, 2018, and U.S. Provisional Patent Application No. 62/670,386 by Hosseini, et al., entitled "REPETITION-BASED TRANSMISSIONS FOR UPLINK ULTRA-RELIABLE LOW LATENCY COMMUNICATION" filed May 11, 2018, assigned to the assignee hereof, and expressly incorporated by reference herein.

BACKGROUND

The following relates generally to wireless communications and more specifically to repetition-based transmissions for uplink ultra-reliable low latency communication (URLLC).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, a UE may be configured to transmit a transport block multiple times in a set of transmission time intervals (TTIs) of a repetition window to improve the chances that the transport block is received by a receiving device. Conventional techniques for supporting uplink repetition-based transmissions of a transport block in a repetition window may be deficient.

SUMMARY

The described techniques relate to improved methods, systems, devices, and apparatuses that support repetition-based transmissions for uplink ultra-reliable low latency communication (URLLC). In some wireless communications systems, a user equipment (UE) may be configured to transmit a transport block multiple times in a set of transmission time intervals (TTIs) or time resources of a repetition window to improve the chances that the transport block is received by a receiving device. In some cases, however, a transport block may not be available to be transmitted (e.g., the transport block may not be received by lower layers from upper layers and be ready for transmission) in a repetition window (e.g., a fixed repetition window) until after a first TTI of the repetition window has passed. As described herein, a UE may support efficient techniques for identifying appropriate configurations for transmitting a transport block in a repetition window (e.g., regardless of when a transport block is ready for transmission).

In particular, out of a number of repetition window configurations available for transmitting a transport block, a UE may select a repetition window configuration corresponding to a set of TTIs or time resources for transmitting the transport block based on a TTI or time resource in which the transport block is available or ready for transmission. That is, the UE may be able to select a configured repetition window corresponding to TTIs or time resources to use for transmitting a transport block based on the TTI or time resource in which the transport block is available or ready for transmission. In some cases, a base station may determine a set of repetition window configurations for repetition-based transmissions from the UE, and the base station may transmit a configuration message that includes a single repetition window configuration (e.g., similar to a fixed repetition window implementation) or a set of repetition window configurations (e.g., similar to a sliding window implementation with a defined number of options for sliding).

The UE may then identify the repetition window configurations that are available for transmitting a transport block based on the received configuration message. In cases where the configuration message includes a set of repetition window configurations, the UE may select a repetition window configuration to use upon identifying that a transport block is configured for repetition-based transmission. In some cases, the UE may identify a first transport block transmission occasion (e.g., a first transmission opportunity or first TTI available for transmission of the transport block) and may select a repetition window configuration from the set of repetition window configurations included in the configuration message received from the base station based on the first transport block transmission occasion. The UE may then transmit the transport block, in an initial transmission, within the first TTI or time resource of the selected repetition window (e.g., the selected repetition window configuration may define or indicate an offset or a first transport block transmission opportunity/TTI associated with the repetition window).

The base station may receive the transport block and, in cases where the UE is configured with a set of possible repetition window configurations, may test a number of repetition window hypotheses corresponding to the configured set of repetition window configurations. The base station may therefore determine a repetition window used by the UE based on consideration of the configured repetition window configurations and the TTI or time resource associated with the received transport block. Based on the repetition window identified as having been used by the UE, the base station may then identify a first TTI or a first time resource used for a transport block transmission by the UE, as well as subsequent TTIs or time resources that may be used by the UE for transport block repetitions. As such, the base station may decode or process the repetition-based transmission of the transport block (e.g., the URLLC transmission).

A method of wireless communication at a UE is described. The method may include identifying that the UE is configured for repetition-based transmission of a transport block within a repetition window, the repetition window including a first TTI and subsequent TTIs, and identifying whether the UE is configured to use a fixed repetition window or a sliding repetition window for repetition-based transmissions. The method may further include transmitting the transport block, in an initial transmission, within the first TTI of the repetition window, where the first TTI of the repetition window is based on whether the repetition window is a fixed repetition window or a sliding repetition window.

An apparatus for wireless communication at a UE is described. The apparatus may include a processor, memory in electronic communication with the processor, and instructions stored in the memory. The instructions may be executable by the processor to cause the apparatus to identify that the UE is configured for repetition-based transmission of a transport block within a repetition window, the repetition window including a first TTI and subsequent TTIs, and identify whether the UE is configured to use a fixed repetition window or a sliding repetition window for repetition-based transmissions. The instructions may be executable by the processor to further cause the apparatus to transmit the transport block, in an initial transmission, within the first TTI of the repetition window, where the first TTI of the repetition window is based on whether the repetition window is a fixed repetition window or a sliding repetition window.

Another apparatus for wireless communication at a UE is described. The apparatus may include means for identifying that the UE is configured for repetition-based transmission of a transport block within a repetition window, the repetition window including a first TTI and subsequent TTIs, and means for identifying whether the UE is configured to use a fixed repetition window or a sliding repetition window for repetition-based transmissions. The apparatus may further include means for transmitting the transport block, in an initial transmission, within the first TTI of the repetition window, where the first TTI of the repetition window is based on whether the repetition window is a fixed repetition window or a sliding repetition window.

A non-transitory computer-readable medium storing code for wireless communication at a UE is described. The code may include instructions executable by a processor to identify that the UE is configured for repetition-based transmission of a transport block within a repetition window, the repetition window including a first TTI and subsequent TTIs, identify whether the UE is configured to use a fixed repetition window or a sliding repetition window for repetition-based transmissions, and transmit the transport block, in an initial transmission, within the first TTI of the repetition window, where the first TTI of the repetition window is based on whether the repetition window is a fixed repetition window or a sliding repetition window.

In some examples of the method, apparatuses, and non-transitory computer-readable medium described herein, identifying whether the UE may be configured to use a fixed repetition window, or a sliding repetition window may include operations, features, means, or instructions for receiving a configuration message that includes an indication of whether the UE may be to use a fixed repetition window or a sliding repetition window.

In some examples of the method, apparatuses, and non-transitory computer-readable medium described herein, identifying whether the UE may be configured to use a fixed repetition window or a sliding repetition window may include operations, features, means, or instructions for determining whether the UE may be to use a fixed repetition window or a sliding repetition window based on a number of repetitions to be included in the repetition-based transmission, a modulation and coding scheme (MCS) of the repetition-based transmission, a packet size of the repetition-based transmission, UE channel conditions, or combinations thereof.

In some examples of the method, apparatuses, and non-transitory computer-readable medium described herein, identifying whether the UE may be configured to use a fixed repetition window or a sliding repetition window may include operations, features, means, or instructions for determining that the UE may be to use a fixed repetition window based on a packet size of the repetition-based transmission being less than a packet size threshold, a MCS of the repetition-based transmission being less than an MCS threshold, a UE channel condition quality being greater than a quality threshold, or combinations thereof.

In some examples of the method, apparatuses, and non-transitory computer-readable medium described herein, identifying whether the UE may be configured to use a fixed repetition window or a sliding repetition window may include operations, features, means, or instructions for determining that the UE may be to use a sliding repetition window based on a packet size of the repetition-based transmission being greater than a packet size threshold, a MCS of the repetition-based transmission being greater than an MCS threshold, a UE channel condition quality being lesser than a quality threshold, or combinations thereof.

In some examples of the method, apparatuses, and non-transitory computer-readable medium described herein, identifying whether the UE may be configured to use a fixed repetition window or a sliding repetition window may include operations, features, means, or instructions for identifying that the UE may be to use a fixed repetition window and delaying initial transmission of the transport block until the first TTI of the repetition window, where the repetition window may be a next available repetition window.

In some examples of the method, apparatuses, and non-transitory computer-readable medium described herein, identifying whether the UE may be configured to use a fixed repetition window or a sliding repetition window may include operations, features, means, or instructions for identifying that the UE may be to use a sliding repetition window and transmitting the transport block, in its initial transmission, in a next available TTI, where the next available TTI may be one of the first TTI or one of the subsequent TTIs of the repetition window.

In some examples of the method, apparatuses, and non-transitory computer-readable medium described herein, a length of the repetition window, in TTIs, may be a periodicity of the repetition window. In some examples of the method, apparatuses, and non-transitory computer-readable medium described herein, a number of transmission repetitions of the transport block may be equal to the periodicity of the repetition window. In some examples of the method, apparatuses, and non-transitory computer-readable medium described herein, a number of transmission repetitions of the transport block may be based on a packet size of the repetition-based transmission and a UE channel condition quality.

A method of wireless communication at a base station is described. The method may include identifying that a UE is configured for repetition-based transmission, transmitting, to the UE, a configuration message that includes an indication of whether the UE is to use a fixed repetition window or a sliding repetition window in repetition-based transmissions, and receiving a transport block transmitted from the UE in accordance with the configuration message.

An apparatus for wireless communication at a base station is described. The apparatus may include a processor, memory in electronic communication with the processor, and instructions stored in the memory. The instructions may be executable by the processor to cause the apparatus to identify that a UE is configured for repetition-based transmission, transmit, to the UE, a configuration message that includes an indication of whether the UE is to use a fixed repetition window or a sliding repetition window in repetition-based transmissions, and receive a transport block transmitted from the UE in accordance with the configuration message.

Another apparatus for wireless communication at a base station is described. The apparatus may include means for identifying that a UE is configured for repetition-based transmission, transmitting, to the UE, a configuration message that includes an indication of whether the UE is to use a fixed repetition window or a sliding repetition window in repetition-based transmissions, and receiving a transport block transmitted from the UE in accordance with the configuration message.

A non-transitory computer-readable medium storing code for wireless communication at a base station is described. The code may include instructions executable by a processor to identify that a UE is configured for repetition-based transmission, transmit, to the UE, a configuration message that includes an indication of whether the UE is to use a fixed repetition window or a sliding repetition window in repetition-based transmissions, and receive a transport block transmitted from the UE in accordance with the configuration message.

Some examples of the method, apparatuses, and non-transitory computer-readable medium described herein may further include operations, features, means, or instructions for determining whether the indication included in the configuration message may be to indicate that the UE may be to use a fixed repetition window or a sliding repetition window based on a number of repetitions to be included in the repetition-based transmission, a MCS of the repetition-based transmission, a packet size of the repetition-based transmission, UE channel conditions, or combinations thereof.

Some examples of the method, apparatuses, and non-transitory computer-readable medium described herein may further include operations, features, means, or instructions for determining that the indication included in the configuration message may be to indicate that the UE may be to use a fixed repetition window based on a packet size of the repetition-based transmission being less than a packet size threshold, a MCS of the repetition-based transmission being less than an MCS threshold, a UE channel condition quality being greater than a quality threshold, or combinations thereof.

Some examples of the method, apparatuses, and non-transitory computer-readable medium described herein may further include operations, features, means, or instructions for determining that the indication included in the configuration message may be to indicate that the UE may be to use a sliding repetition window based on a packet size of the repetition-based transmission being greater than a packet size threshold, a MCS of the repetition-based transmission being greater than an MCS threshold, a UE channel condition quality being lesser than a quality threshold, or combinations thereof.

A method of wireless communication at a UE is described. The method may include identifying that a transport block is configured for repetition-based transmission within a repetition window, the repetition window including a first TTI and subsequent TTIs, selecting a repetition window configuration from a set of repetition window configurations, and transmitting the transport block in an initial transmission within the first TTI of the repetition window, where the repetition window is based on the selected repetition window configuration.

An apparatus for wireless communication at a UE is described. The apparatus may include a processor, memory in electronic communication with the processor, and instructions stored in the memory. The instructions may be executable by the processor to cause the apparatus to identify that the UE is configured for repetition-based transmission of a transport block within a repetition window, the repetition window including a first TTI and subsequent TTIs, select a repetition window configuration from a set of repetition window configurations, and transmit the transport block in an initial transmission within the first TTI of the repetition window, where the repetition window is based on the selected repetition window configuration.

Another apparatus for wireless communication at a UE is described. The apparatus may include means for identifying that a transport block is configured for repetition-based transmission within a repetition window, the repetition window including a first TTI and subsequent TTIs, selecting a repetition window configuration from a set of repetition window configurations, and transmitting the transport block in an initial transmission within the first TTI of the repetition window, where the repetition window is based on the selected repetition window configuration.

A non-transitory computer-readable medium storing code for wireless communication at a UE is described. The code may include instructions executable by a processor to identify that the UE is configured for repetition-based transmission of a transport block within a repetition window, the repetition window including a first TTI and subsequent TTIs, select a repetition window configuration from a set of repetition window configurations, and transmit the transport block in an initial transmission within the first TTI of the repetition window, where the repetition window is based on the selected repetition window configuration.

Some examples of the method, apparatuses, and non-transitory computer-readable medium described herein may further include operations, features, means, or instructions for receiving a configuration message that includes the set of repetition window configurations. Some examples of the method, apparatuses, and non-transitory computer-readable medium described herein may further include operations, features, means, or instructions for identifying a first transport block transmission occasion based on an availability of the identified transport block for transmission, where the repetition window configuration may be selected based on the first transport block transmission occasion.

Some examples of the method, apparatuses, and non-transitory computer-readable medium described herein may further include operations, features, means, or instructions for determining that the repetition window configuration corresponds to a set of TTIs including the first TTI that is the same as a TTI in which the transport block is ready for transmission or that is closest to the TTI in which the transport block is ready for transmission, and selecting the repetition window configuration based on the determining.

In some examples of the method, apparatuses, and non-transitory computer-readable medium described herein, selecting the repetition window configuration from the set of repetition window configurations may include operations, features, means, or instructions for selecting the repetition window configuration based on one or more elements of the repetition window configuration, the one or more elements including at least one of a number of transmission repetitions of the transport block, a periodicity of the repetition window, or an offset of the repetition window. Some examples of the method, apparatuses, and non-transitory computer-readable medium described herein may further include operations, features, means, or instructions for determining a set of TTIs corresponding to the repetition window configuration based on the one or more elements, where the repetition window configuration is selected based on the set of TTIs corresponding to the repetition window configuration.

In some examples of the method, apparatuses, and non-transitory computer-readable medium described herein, selecting the repetition window configuration from the set of repetition window configurations may include operations, features, means, or instructions for selecting the repetition window configuration based on an offset of the repetition window defined by the repetition window configuration. In some examples of the method, apparatuses, and non-transitory computer-readable medium described herein, a length of the repetition window, in TTIs, may be equal to a periodicity of the repetition window, and where a number of transmission repetitions of the transport block may be equal to the periodicity of the repetition window. In some examples of the method, apparatuses, and non-transitory computer-readable medium described herein, a number of transmission repetitions of the transport block may be based on a packet size of the repetition-based transmission and a UE channel condition quality. In some examples of the method, apparatuses, and non-transitory computer-readable medium described herein, each repetition window configuration is associated with a respective resource set, demodulation reference signal (DMRS) pattern, cyclic shift pattern, interleaved frequency division multiple access (iFDMA) pattern, or a combination thereof.

A method of wireless communication at a base station is described. The method may include determining a set of repetition window configurations for repetition-based transmissions, transmitting, to a UE, a configuration message that includes the set of repetition window configurations, and receiving a transport block transmitted from the UE in accordance with one of the set of repetition window configurations.

An apparatus for wireless communication at a base station is described. The apparatus may include a processor, memory in electronic communication with the processor, and instructions stored in the memory. The instructions may be executable by the processor to cause the apparatus to determine a set of repetition window configurations for repetition-based transmissions, transmit, to a UE, a configuration message that includes the set of repetition window configurations, and receive a transport block transmitted from the UE in accordance with one of the set of repetition window configurations.

Another apparatus for wireless communication at a base station is described. The apparatus may include means for determining a set of repetition window configurations for repetition-based transmissions, transmitting, to a UE, a configuration message that includes the set of repetition window configurations, and receiving a transport block transmitted from the UE in accordance with one of the set of repetition window configurations.

A non-transitory computer-readable medium storing code for wireless communication at a base station is described. The code may include instructions executable by a processor to determine a set of repetition window configurations for repetition-based transmissions, transmit, to a UE, a configuration message that includes the set of repetition window configurations, and receive a transport block transmitted from the UE in accordance with one of the set of repetition window configurations.

In some examples of the method, apparatuses, and non-transitory computer-readable medium described herein, receiving the transport block further may include operations, features, means, or instructions for testing a number of repetition window hypotheses corresponding to at least some of the set of repetition window configurations, where the number may be based on those of the set of repetition window configurations that include transmission opportunities associated with a TTI in which the transport block may be received.

Some examples of the method, apparatuses, and non-transitory computer-readable medium described herein may further include operations, features, means, or instructions for determining a repetition window used by the UE based on the testing, identifying a first TTI and subsequent TTIs based on the determined repetition window and receiving one or more additional repeated transport blocks based on the identified subsequent TTIs. In some examples of the method, apparatuses, and non-transitory computer-readable medium described herein, the transport block may be received in the first TTI.

Some examples of the method, apparatuses, and non-transitory computer-readable medium described herein may further include operations, features, means, or instructions for adjusting a number of the set of repetition window configurations included in the configuration message based on a target latency metric satisfying a threshold. In some examples of the method, apparatuses, and non-transitory computer-readable medium described herein, at least one of the set of repetition window configurations may be determined based on a number of repetitions to be included in the repetition-based transmission, a MCS of the repetition-based transmission, a packet size of the repetition-based transmission, UE channel conditions, or combinations thereof.

Some examples of the method, apparatuses, and non-transitory computer-readable medium described herein may further include operations, features, means, or instructions for adjusting a number of the set of repetition window configurations included in the configuration message based on a packet size of the repetition-based transmission satisfying a packet size threshold, a MCS of the repetition-based transmission satisfying an MCS threshold, a UE channel condition quality satisfying a quality threshold, or combinations thereof. In some examples of the method, apparatuses, and non-transitory computer-readable medium described herein, determining the set of repetition window configurations may include operations, features, means, or instructions for determining, for each of the set of repetition window configurations, a number of transport block transmission repetitions, a repetition window periodicity, a repetition window offset, or combinations thereof.

In some examples of the method, apparatuses, and non-transitory computer-readable medium described herein, determining the set of repetition window configurations may include operations, features, means, or instructions for determining a number of transport block transmission repetitions and a repetition window periodicity for the set of repetition window configurations and determining, for each of the set of repetition window configurations, a repetition window offset. Some examples of the method, apparatuses, and non-transitory computer-readable medium described herein may further include operations, features, means, or instructions for identifying that the UE may be configured for repetition-based transmission, where the configuration message may be transmitted to the UE based on the identification.

DETAILED DESCRIPTION

Figure 1:
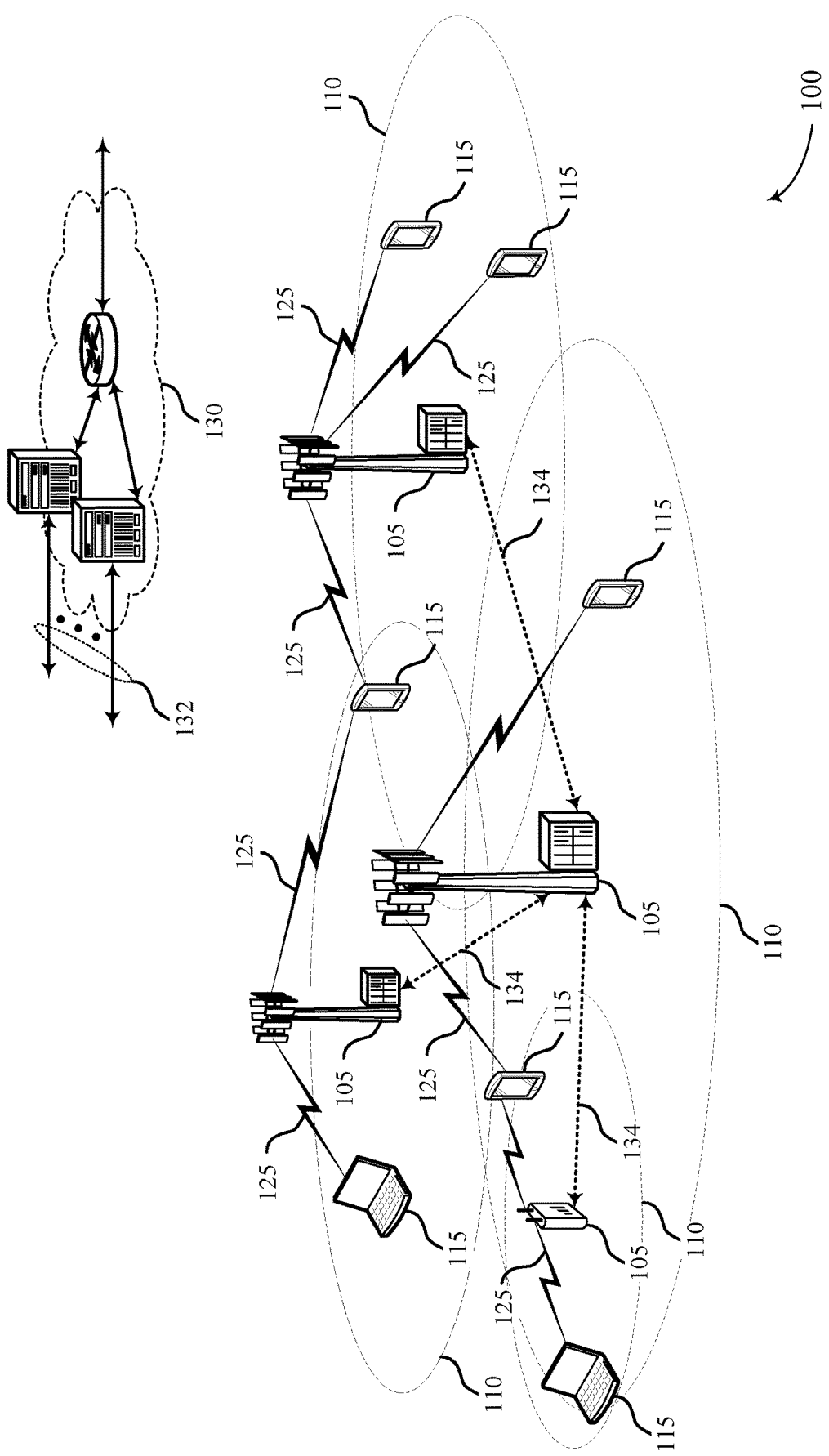
FIG. 1 illustrates an example of a wireless communications system that supports repetition-based transmissions for uplink ultra-reliable low latency communication (URLLC) in accordance with aspects of the present disclosure.

Some wireless communications systems may support ultra-reliable low latency communication (URLLC) between a base station and a user equipment (UE). To minimize latency for uplink URLLC, a UE may be configured to transmit a URLLC transport block in a first available uplink TTI. Further, to maximize reliability for uplink URLLC, the UE may be configured to transmit the URLLC transport block multiple times in a set of TTIs of a repetition window to increase the chances that the URLLC transport block is received by a receiving device. Thus, as described herein, when a UE identifies a URLLC transport block to transmit to a base station, the UE may transmit the URLLC transport block multiple times in a repetition window. The repetition window used for the URLLC transmission may depend on whether the UE is configured to use a fixed repetition window or a sliding repetition window.

Each repetition window may be associated with an offset or a first transmission occasion (e.g., a first transport block transmission opportunity), a number of transport block repetitions (K), and a repetition window periodicity (P). That is, each repetition window configuration may be associated with an offset (e.g., a first transmission occasion), a K value, and a P value. Transport blocks may be transmitted using TTIs (or sTTIs) within the repetition window. A UE may identify a transport block configured for repetition-based transmission, identify the first transmission occasion associated with a repetition window, and transmit the transport block in the first TTI of the repetition window corresponding to the first transmission occasion. In cases where the repetition window configuration is associated with K=2, the UE may transmit a transport block repetition in a subsequent TTI following the first TTI of the repetition window (e.g., resulting in two transport block transmissions or repetitions within the repetition window). In some cases, the repetition may only start at the beginning of the transmission occasion (e.g., the transport block repetition may only be performed in the first or beginning TTIs of the repetition window). Otherwise (e.g., when a transport block configured for repetition-based transmission is identified in the middle of a repetition window), transmission of the transport block may be delayed until the next transmission occasion, which may occur in another repetition window (e.g., in another periodicity interval).

In some cases, a UE may be configured to use a fixed repetition window for repetition-based uplink URLLC transmissions. In such cases, when the UE is scheduled to transmit a URLLC transport block, the UE may wait until a next available repetition window to transmit the transport block. In some aspects, however, the latency associated with waiting for a next available repetition window may be high (e.g., when P is large), which may be detrimental to a URLLC application. Thus, in other cases, to avoid the latency associated with using a fixed repetition window, the UE may be configured to use a sliding repetition window for repetition-based uplink URLLC transmissions. In some examples of such cases, when the UE is scheduled to transmit a URLLC transport block, the UE may adjust (or shift) a repetition window such that the first TTI in which a transport block is available for transmission is a first TTI of the repetition window. However, when a UE uses a sliding repetition window for transmitting a transport block, it may be challenging for a base station to identify the repetition window used to transmit the transport block.

As described herein, a wireless communications system may support efficient techniques for configuring a UE to utilize a fixed repetition window or a sliding repetition window for URLLC transport block transmissions in an attempt to satisfy latency and reliability constraints associated with the transport block while limiting the complexity at the base station for receiving the URLLC transport block transmissions. In particular, the UE may be configured to determine whether to use a fixed repetition window or a sliding repetition window (or determine a repetition window configuration) for URLLC transport block transmissions based on various factors. As an example, if the UE determines that the number of repetitions of a transport block to be included in a repetition window is above a threshold, the UE may determine to use a sliding repetition window (e.g., since the UE may have to wait a long time for a next available repetition window if a fixed repetition window is used). Alternatively, if the UE determines that the number of repetitions of a transport block to be included in a repetition window is below a threshold, the UE may determine to use a fixed repetition window (e.g., since the UE may not have to wait a long time for a next available repetition window if a fixed repetition window is used).

In some examples, the UE may be configured to utilize a sliding repetition window for URLLC transport block transmissions according to a set of repetition window configurations. For example, each repetition window may be associated with an offset or a first transmission occasion (e.g., a first transport block transmission opportunity), a number of transport block repetitions, and a repetition window periodicity. The base station may indicate a set of fixed repetition window configurations to the UE (e.g., via a radio resource control (RRC) or other configuration message) enabling aspects of sliding repetition window implementations for repetition-based transmissions at the UE. For example, a UE may, in some cases, start transport block repetitions from a next available transmission occasion (e.g., by selecting a repetition window configuration with a transmission occasion corresponding to the next available transmission occasion).

Upon receiving a transport block from the UE, the base station may perform hypothesis testing to determine which repetition window configuration is being used by the UE. Determination of the repetition window configuration used by the UE may allow for efficient handling of transport block repetitions received by the base station. For example, based on the determined repetition window used by the UE, the base station may accurately determine a TTI associated with a first transport block transmission as well as one or more subsequent TTIs associated with transport block repetitions. The base station may therefore efficiently and accurately combine the transport block repetitions for reception (e.g., for decoding and other processing) of the URLLC transmission. Without such techniques, the base station may undesirably interpret transport blocks transmitted over different repetition windows as repeated transport blocks (e.g., which may actually be different or non-repeated transport blocks associated with different URLLC transmissions), which may result in inefficient or failed reception of the URLLC transmission.

Further, a base station may determine the set of repetition window configurations usable by the UE based on target latency and implementation complexity considerations. For example, a set of repetition window configurations may be determined or configured by a base station such that the UE may have more or less first transport block transmission opportunities (e.g., according to latency considerations), more or less transport block repetitions within a repetition window (e.g., according to reliability considerations), etc. However, as latency and reliability are emphasized, the number of hypotheses tested in order for the base station to determine the correct repetition window configuration used by the UE may increase (e.g., as discussed in more detail below), which may increase implementation complexity. Beneficially, the described techniques provide for flexible and dynamic configuration of repetition windows to meet system constraints (e.g., target system latency, implementation complexity, etc.), as well as efficient methods for configuring a UE to utilize such repetition windows.

Aspects of the disclosure are initially described in the context of a wireless communications system. Examples of repetition window configurations, processes, and signaling exchanges that support repetition-based transmissions for uplink URLLC are then described. Aspects of the disclosure are further illustrated by and described with reference to apparatus diagrams, system diagrams, and flowcharts that relate to repetition-based transmissions for uplink URLLC.

FIG. 1 illustrates an example of a wireless communications system 100 that supports repetition-based transmissions for uplink URLLC in accordance with various aspects of the present disclosure. The wireless communications system 100 includes base stations 105, UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, URLLC, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" may refer to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB) or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

Time intervals of a communications resource in LTE or NR may be organized according to radio frames each having a duration of 10 milliseconds (ms). The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs). In some cases, a TTI and a sTTI may be used interchangeably.

The numerology employed within wireless communications system 100 (i.e., subcarrier size, symbol-period duration, and/or TTI duration) may be selected or determined based on a type of communication. The numerology may be selected or determined in view of an inherent tradeoff between latency for low latency applications and efficiency for other applications, for example. In some cases, a resource block may contain 12 consecutive subcarriers in the frequency domain and, for a normal cyclic prefix in each orthogonal frequency division multiplexing (OFDM) symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be. Resource blocks may be defined according to other numerologies in various examples.

As mentioned above, wireless communications system 100 may support URLLC between a base station 105 and a UE 115. To minimize latency for uplink URLLC, a UE 115 may be configured to transmit a URLLC transport block in a first available uplink TTI (or sTTI). Further, to maximize reliability for uplink URLLC, the UE 115 may be configured to transmit the URLLC transport block multiple times in a set of TTIs of a repetition window to increase the chances that the URLLC transport block is received by a receiving device (e.g., where the number of repetitions of the URLLC transport block may be based on the packet size and UE conditions). Thus, as described herein, when a UE 115 identifies a URLLC transport block to transmit to a base station 105, the UE 115 may be scheduled (e.g., using semi-persistent scheduling (SPS)) to transmit the URLLC transport block multiple times in a repetition window. The repetition window used for the URLLC transmission may depend on whether the UE 115 is configured to use a fixed repetition window or a sliding repetition window. Additionally, or alternatively, the repetition window used for the URLLC transmission may depend on a repetition window configuration, as described in more detail below.

Figure 2A:
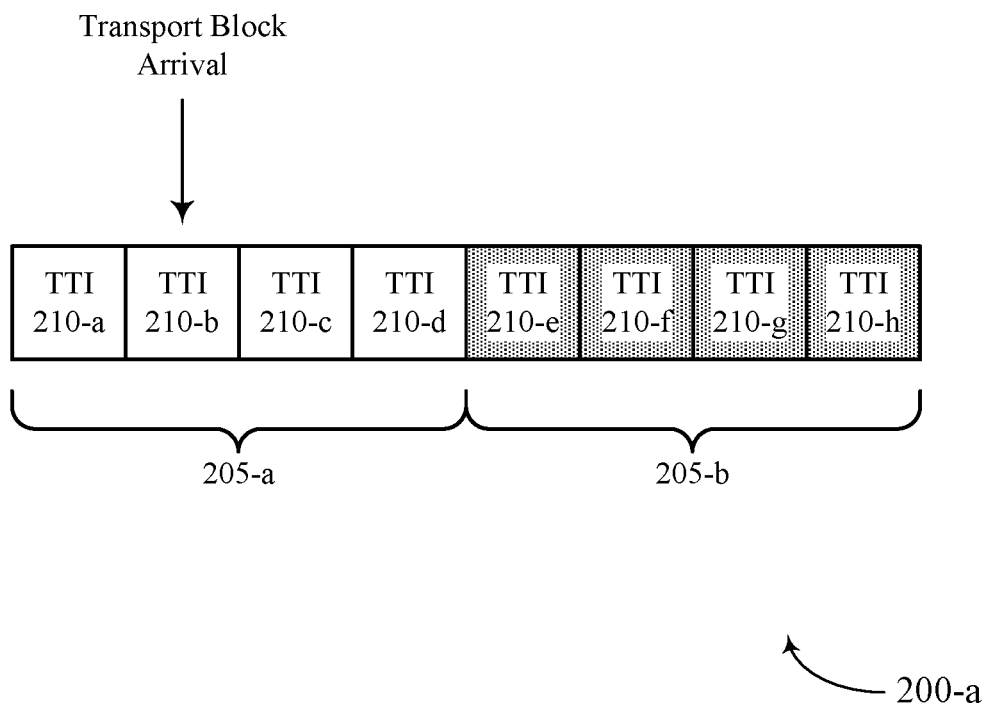
FIGS. 2A and 2B illustrate examples of transport block transmissions in a repetition window in accordance with aspects of the present disclosure.
Figure 2B:
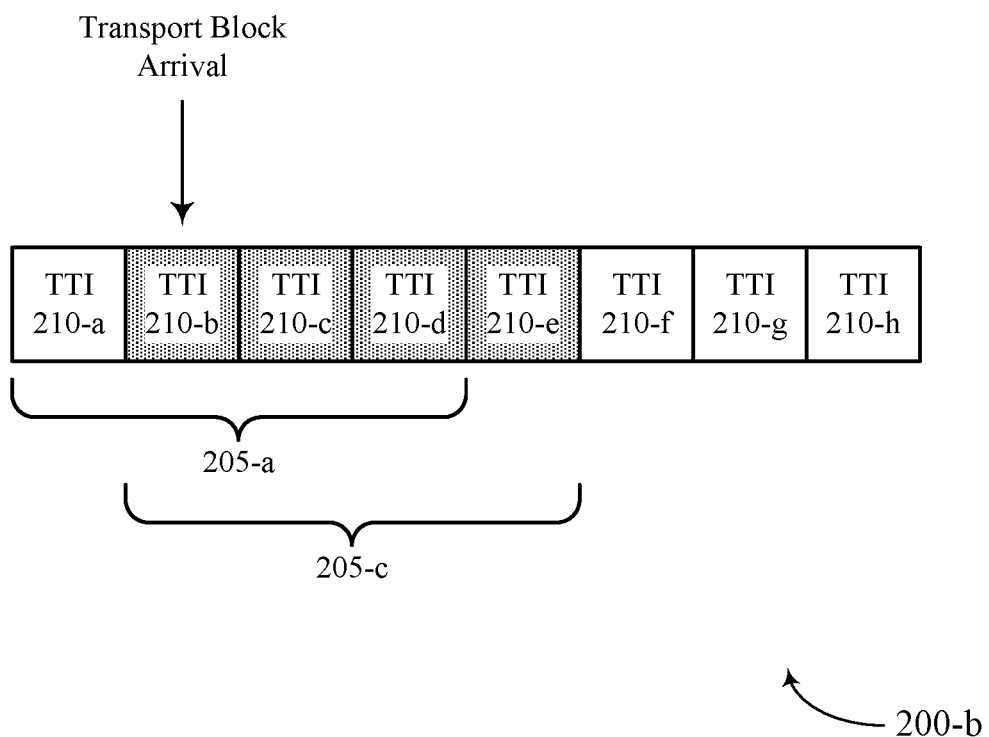

In the example of FIG. 2A, a UE 115 may be configured to use a fixed repetition window for transport block transmissions 200-a, where the fixed repetition window may span a preconfigured set of TTIs 210. Specifically, a first repetition window 205-a may span a preconfigured set of four TTIs 210 (i.e., TTIs 210-a through 210-d), and a second repetition window 205-b may span another preconfigured set of four TTIs 210 (i.e., TTIs 210-e through 210-h). The number of TTIs 210 in a repetition window (e.g., four) may correspond to the periodicity (P) of the repetition window. In this example, a UE 115 may transmit a transport block in a first available repetition window after the transport block becomes available for transmission (e.g., the first transmission occasion may occur in a subsequent fixed repetition window, at TTI 210-e). In the example of FIG. 2B, a UE 115 may be configured to use a sliding repetition window for a transport block transmission 200-b. In this example, the UE 115 may adjust a repetition window for a transport block transmission based on the TTI in which the transport block becomes available for transmission.

In some cases, a UE 115 may identify a URLLC transport block to transmit to a base station 105 in a configured repetition window immediately prior to a first TTI of the repetition window. In such cases, the UE 115 may transmit the URLLC transport block in the configured repetition window. In other cases, however, a UE 115 may identify a URLLC transport block to transmit to a base station 105 in the middle of a repetition window (e.g., during TTI 210-b of repetition window 205-a). In such cases, if the UE 115 is configured to use a fixed repetition window, the UE 115 may wait until a subsequent repetition window (e.g., repetition window 205-b) to transmit the URLLC transport block to the base station 105. Since the UE 115 may wait until a subsequent repetition window to transmit the URLLC transport block, a receiving base station 105 may be able to identify the repetition window used to transmit the transport block with limited complexity (i.e., since the transport block may not cross the boundary of two configured repetition windows resulting in no ambiguity). Further, the transmission of the transport block may be reliable as the configured number of repetitions (K, where K≤P) of the transport block may be guaranteed.

However, using the fixed repetition window, if a transport block becomes available for transmission (e.g., is received from upper layers) after a first TTI of a repetition window, there may be a delay associated with the transmission of the transport block. That is, the UE 115 may have to wait until the beginning of a next periodicity since the transport block may only be transmitted at the beginning of a repetition window (e.g., at a first transmission occasion), and waiting until the beginning of a next periodicity may result in high latency. For example, if a periodicity of six is configured for fixed repetition windows, and a transport block is available for an initial transmission in a second TTI of a repetition window, the UE 115 may have to wait for five TTIs until the beginning of the next repetition window before transmitting the transport block, which may be unacceptable. Thus, in some aspects, it may be appropriate for a UE 115 to utilize a sliding repetition window for transmitting a transport block to a base station 105. For instance, in the example of FIG. 2B, the UE 115 may adjust (or shift) the repetition window (e.g., configured repetition window 205-a) such that the first TTI of the adjusted repetition window 205-c includes the first TTI 210-b in which the transport block is available for transmission as a first TTI of the adjusted repetition window 205-c.

Accordingly, using a sliding repetition window, the UE 115 may be able to minimize latency by transmitting the transport block in a first available TTI. In some cases, with a sliding repetition window the UE 115 may start transport block repetitions from any TTI and continue the repetitions over K TTIs. For example, with sliding repetition window operation, the UE may be able to start repetition-based transmissions in any TTI and continue repetitions over the K TTIs. Further, as with using a fixed repetition window, the transmission of the transport block may be reliable as the configured number of repetitions (K) of the transport block may be guaranteed. However, when a sliding repetition window is used for a URLLC transmission, it may be challenging for a base station to identify the repetition window used to transmit the transport block (i.e., since the transport block may cross the boundary of two configured repetition windows resulting in ambiguity).

That is, from the perspective of the UE 115, repetitions may not be overlapping. However, from the perspective of the base station 105, two repetition-based transmission (e.g., two different URLLC transmissions) may be overlapping (e.g., when the base station 105 cannot correctly decode or misidentifies the starting position of a repetition window). For example, if the base station 105 misses an initial transmission of the transport block in the sliding repetition window, the base station 105 may determine a different starting point for the transport block transmissions from the actual starting point, and repetition windows of different transport blocks at the base station may overlap (e.g., resulting in ambiguity).

As such, techniques described herein provide for configuring a UE 115 to utilize a repetition window selected from a configured set of repetition window configurations for a repetition-based or URLLC transport block transmission. As such, UE 115 may, in some cases, start transport block repetitions from a next available transmission occasion (e.g., by selecting a repetition window configuration with a transmission occasion corresponding to the next available transmission occasion). A base station 105 may perform hypothesis testing according to the set of repetition window configurations to determine a repetition window used by the UE 115 to remove ambiguity (e.g., and thus remove potential misidentification of transport blocks occurring across a repetition window boundary as transport block repetitions when a first transport block may have been missed) and efficiently identify other transport block repetitions within the repetition window. With multiple configurations, the base station may still perform hypothesis testing (e.g., similar to when a sliding window is used). However, the implementation complexity (e.g., the number of hypotheses to be tested) may be reduced, compared to sliding window operation, depending on the number of repetition window configurations implemented and the values selected for K and P.

Figure 3:
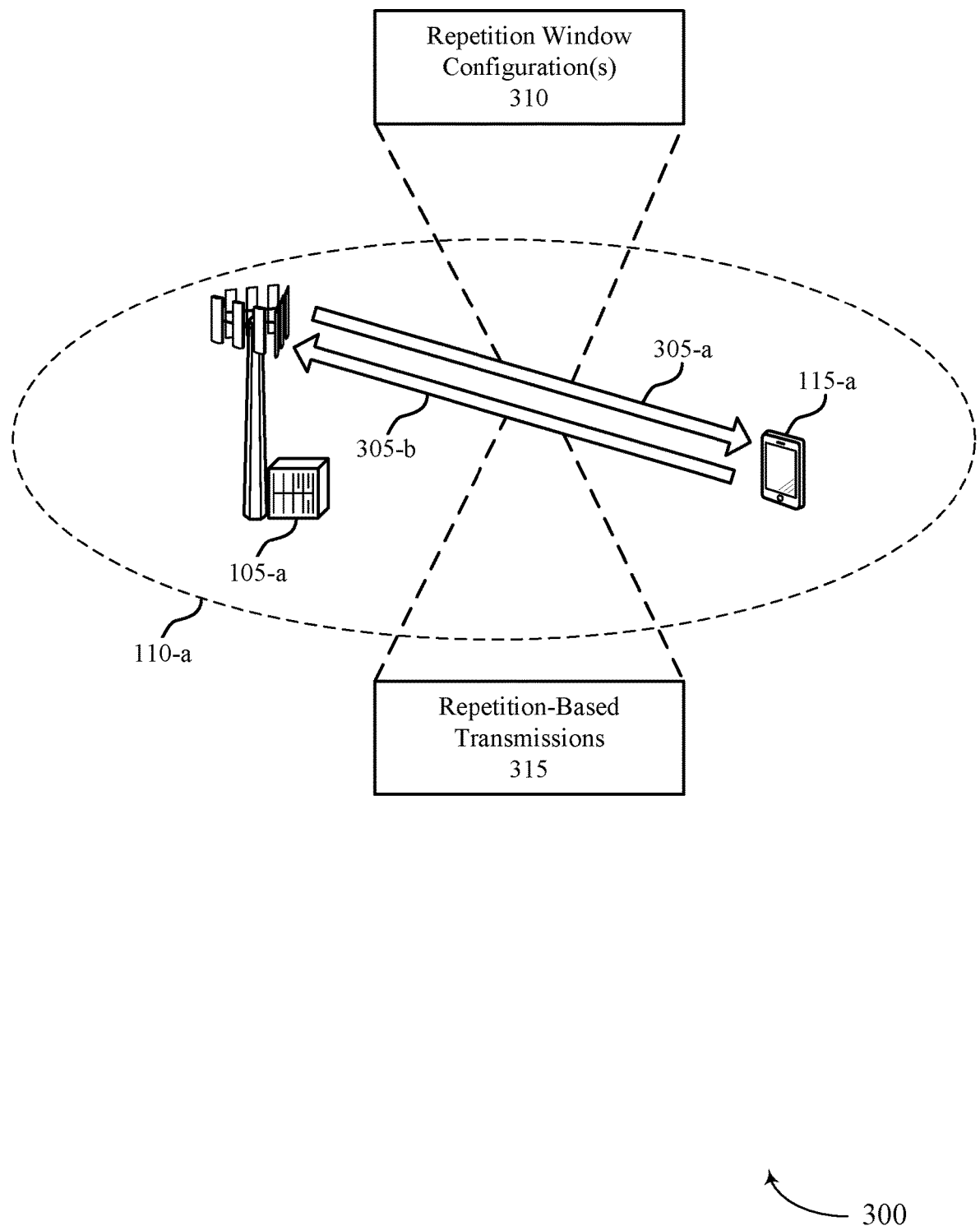
FIG. 3 illustrates an example of a wireless communications system that supports repetition-based transmissions for uplink URLLC in accordance with aspects of the present disclosure.

FIG. 3 illustrates an example of a wireless communications system 300 that supports repetition-based transmissions for uplink URLLC in accordance with aspects of the present disclosure. Wireless communications system 300 includes base station 105-a and UE 115-a, which may be examples of the corresponding devices described with reference to FIG. 1. Base station 105-a may communicate with UEs 115 (including UE 115-a) within coverage area 110-a. For example, base station 105-a may transmit downlink signals to UE 115-a on carrier 305-a, and UE 115-a may transmit uplink signals to base station 105-*a* on carrier 305-*b*. In some cases, carrier 305-*a* and carrier 305-*b* may be the same carrier. Wireless communications system 300 may implement aspects of wireless communications system 100. For example, wireless communications system 300 may support efficient techniques for configuring a UE 115 to utilize a fixed repetition window or a sliding repetition window for a URLLC transport block transmission.

In the example of FIG. 3, base station 105-*a* may transmit a repetition window configuration 310 to UE 115-*a* to configure UE 115-*a* to determine when to use a fixed repetition window or a sliding repetition window for repetition-based transmissions 315. If the UE 115-*a* identifies that a transport block is available for an initial transmission in a first TTI of a repetition window (i.e., the first TTI in which the transport block is available for transmission is the first TTI of the repetition window), the UE 115-*a* may simply transmit the transport block in the repetition window (i.e., since there may be no reason to adjust (or shift) the repetition window). However, if the UE 115-*a* identifies that a transport block is available for an initial transmission in the middle of a repetition window (i.e., the first TTI in which the transport block is available for transmission is not the first TTI in the repetition window), the UE 115-*a* may use the techniques described herein to determine whether to use a fixed repetition window or a sliding repetition window for transmitting the transport block (e.g., based on repetition window configuration 310).

In some examples, the implementation of a fixed repetition window or a sliding repetition window may depend on K (i.e., a number of transport block repetitions). For example, a fixed repetition window may be configured for the UE 115-*a* when K is less than some threshold (e.g., K<K_th). Alternatively, if it is desirable for the UE 115-*a* to have a larger number K such that K exceeds the threshold (e.g., K>K_th), a sliding repetition window may be used. In some cases, the threshold (K_th) may depend on P (e.g., the transport block repetition threshold may, in some cases, depend on the repetition window periodicity). If the base station 105-*a* does not want to allow fixed window operation, the base station 105-*a* may select or configure large K values (e.g., the base station 105-*a* may select the repetition window configuration and corresponding K to be used by the UE 115-*a*). In some cases, the wireless communications system may be preconfigured such that for any value of K such that K>K_th, a sliding repetition window configuration may be used.

Thus, in some aspects of the techniques described herein, UE 115-*a* may determine whether to use a fixed repetition window or a sliding repetition window for an uplink transmission of a transport block based on a number of repetitions of the transport block to be included in a repetition window (i.e., the length of the repetition window). Because the number of repetitions of the transport block to be included in the repetition window may correspond to other factors (e.g., a modulation and coding scheme (MCS) to be used for the transport block transmissions, a packet-size of the transport block, UE channel conditions, etc.), UE 115-*a* may also determine whether to use a fixed repetition window or a sliding repetition window for the uplink transmission based on these factors. Thus, UE 115-*a* may determine whether to use the fixed repetition window for the uplink transmission of the transport block based on the number of repetitions of the transport block to be included in a repetition window, the MCS to be used for the transport block transmissions, a packet-size of the transport block, UE channel conditions, etc.

In one example, if UE 115-*a* determines that the number of repetitions of the transport block to be included in the repetition window is above a threshold number of repetitions, the MCS to be used for the transport block transmissions is above a threshold MCS, the packet-size of the transport block is above a threshold packet-size, or the UE channel condition quality is below a threshold channel condition quality, UE 115-*a* may determine to use (e.g., or the base station may determine and configure the UE to follow) a sliding repetition window for a transmission of the transport block. That is, because these conditions may indicate that the number of repetitions of the transport block to be included in the repetition window may be high or above a threshold, the latency associated with waiting on a subsequent repetition window to transmit the transport block may be high (i.e., since the UE 115-*a* may have to wait a long period of time until a next repetition window to transmit the transport block if a fixed repetition window is used). Thus, UE 115-*a* may determine to use a sliding repetition window to minimize the latency of the transport block transmission.

In another example, if UE 115-*a* determines that the number of repetitions of the transport block to be included in the repetition window is below a threshold number of repetitions, the MCS to be used for the transport block is below a threshold MCS, the packet-size of the transport block is above a threshold packet-size, or the UE channel condition quality is above a threshold, UE 115-*a* may determine to use a fixed repetition window for a transmission of the transport block. That is, because these conditions may indicate that the number of repetitions of the transport block to be included in the repetition window may be low or below a threshold, the latency associated with waiting on a subsequent repetition window to transmit the transport block may be low (i.e., since the UE 115-*a* may not have to wait a long period of time until a next repetition window to transmit the transport block if a fixed repetition window is used). Thus, UE 115-*a* may determine to use a fixed repetition window to limit the complexity at base station 105-*a* associated with identifying the repetition window and receiving the transport block transmissions.

The examples described above are related to a UE 115-*a* determining whether to use a fixed repetition window or a sliding repetition window for a transport block transmission based on the number of repetitions of the transport block to be included in a repetition window, the MCS to be used for the transport block transmissions, a packet-size of the transport block, UE channel conditions, etc. In some aspects, however, the UE 115-*a* may receive a configuration message including an indication from base station 105-*a* of whether UE 115-*a* is to use a fixed repetition window or a sliding repetition window for repetition-based transmissions of the transport block. In such aspects, base station 105-*a* may determine whether the indication included in the configuration message is to indicate that the UE is to use a fixed repetition window or a sliding repetition window based on the number of repetitions of the transport block to be included in a repetition window, the MCS to be used for the transport block transmissions, a packet-size of the transport block, UE channel conditions, etc.

In some cases, base station 105-*a* may determine whether the indication included in the configuration message is to indicate that the UE is to use a fixed repetition window or a sliding repetition window based on system latency and implementation complexity considerations. Further, as discussed above, UE 115-*a* may receive a configuration message including an indication from base station 105-*a* of whether UE 115-*a* is to use a fixed repetition window or a sliding repetition window for repetition-based transmissions of the transport block. For example, the configuration message may include a single repetition window configuration, which may indicate a fixed repetition window. Alternatively, the configuration message may include a set of repetition window configurations, which may indicate sliding repetition windows may be used by the UE 115-*a*. In some cases, repetition window configuration 310 may refer to an indication of whether the UE 115-*a* is to use a fixed or sliding repetition window configuration or may refer to one or more repetition window configurations including one or more elements or parameters defining each of the one or more repetition window configurations. The base station 105-*a* may indicate repetition window configuration 310 to the UE 115-*a* in the configuration message via RRC or SPS signaling.

In cases where the base station 105-*a* configures a set of possible repetition window configurations, the base station 105-*a* may, upon receiving a transport block from the UE 115-*a*, perform hypothesis testing to determine which repetition window configuration is being used by the UE 115-*a*. Determination of the repetition window configuration used by the UE 115-*a* may allow for efficient handling of transport block repetitions received by the base station 105-*a*. For example, the base station 105-*a* may accurately determine a TTI associated with a first transport block transmission as well as one or more subsequent TTIs associated with transport block repetitions in order to combine the transport block repetitions for reception (e.g., decoding and other processing) of the URLLC transmission. Otherwise, the base station 105-*a* may undesirably interpret transport blocks transmitted over different repetition windows (e.g., which may be different or non-repeated transport blocks associated with different URLLC transmissions) as repeated transport blocks, which may result in inefficient or failed reception of the URLLC transmission.

Figure 4:
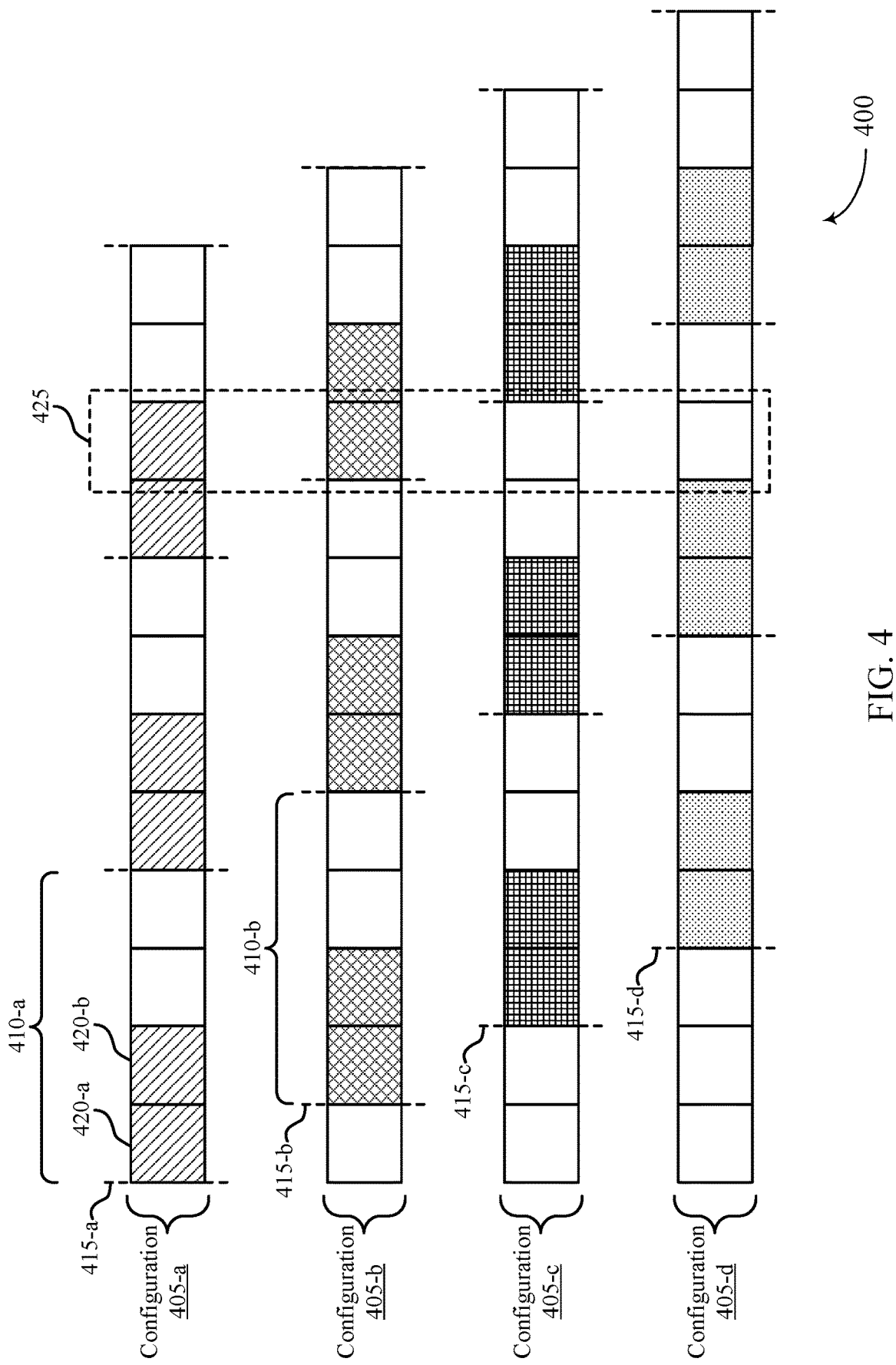
FIGS. 4 and 5 illustrate example repetition window configurations that support repetition-based transmissions for uplink URLLC in accordance with aspects of the present disclosure.

FIG. 4 illustrates examples of repetition window configurations 400 that support repetition-based transmissions for uplink URLLC in accordance with aspects of the present disclosure. In some examples, repetition window configurations 400 may implement aspects of wireless communications system 100 and wireless communications system 300.

Each repetition window may be associated with an offset or a first transmission occasion 415 (e.g., a first transport block transmission opportunity), a number of transport block repetitions (K) (e.g., shaded regions), and a repetition window periodicity 410 (P). That is, each configuration 405 (e.g., each repetition window configuration 405) may be associated with an offset (e.g., a first transmission occasion 415), a K value, and a P value (e.g., a repetition window periodicity 410). Transport blocks 420 may be transmitted using TTIs (e.g., sTTIs, slots, or other time resources) within the repetition window. For example, configuration 405-*a* may be associated with a first transmission occasion 415-*a*, a repetition window periodicity 410-*a* (e.g., P=4 TTIs), and a number of repetitions (e.g., K=2 transport blocks). A UE 115 may identify a transport block configured for repetition-based transmission, identify the first transmission occasion 415-*a*, and transmit the transport block (e.g., transport block 420-*a*) in the first TTI of the repetition window corresponding to the first transmission occasion 415-*a*. In cases where configuration 405-*a* is associated with K=2, the UE 115 may transmit a transport block repetition (e.g., transport block 420-*b*) in a subsequent TTI following the first TTI of the repetition window.

In some cases, multiple SPS configurations (e.g., repetition windows) may be defined, and one, several, or all may be indicated to a UE 115. The configurations may have different periodicities, offsets, and K values. In some cases, a P value, offset, and K value may be the same for all configurations. In some examples, the offset may be defined as the transmission occasion associated with the repetition window, as the TTI or sTTI associated with a first transmission opportunity in the repetition window, as some offset from a predefined or preconfigured repetition window, etc. For example, the offset of configuration 405-*b*, corresponding to the transmission occasion 415-*b*, may be indicated as a single TTI or sTTI offset from configuration 405-*a*, another configuration, or some reference point.

In the example of FIG. 4, P=4 (e.g., each configuration 405 is associated with a repetition window periodicity 410 equal to 4 TTIs or 4 sTTIs) and K=4 (e.g., each configuration 405 is associated with two repetitions of a transport block 420 beginning at the transmission occasion 415 associated with the particular configuration 405). In some cases, K transmissions may be guaranteed. A UE 115 may not transmit at any time, but there may be four occasions (e.g., the number of occasions may be the same as the number of configurations 405), where the transport block may be sent (e.g., in an initial transmission). For example, a UE 115 may identify that the UE 115 is configured for repetition-based transmission of a transport block and may select one of the configurations 405-*a*, 405-*b*, 405-*c*, or 405-*d* based on whether the UE 115 desires to transmit the transport block according to transmission occasion 415-*a*, 415-*b*, 415-*c*, or 415-*d*.

A base station 105 may perform hypothesis testing at a shared TTI (e.g., a floating window where a TTI location may include a transport block transmission associated with more than one configuration 405). In the present example, a base station may check as few as two hypotheses for any given TTI/sTTI. For example, a transport block received in floating window 425, or a TTI/sTTI associated with the window 425, may be associated with either configuration 405-*a* or configuration 405-*b*. As such, repetition window configurations may be configured as to reduce the number of testable hypotheses at the base station 105 (e.g., to reduce implementation complexity). For example, in the example of FIG. 4, K=2 and the number of repetition window hypotheses that may be tested may also be 2, whereas, in FIG. 5, K=4 and the number of repetition window hypotheses that may be tested, in the case of FIG. 5, may also be 4.

In some cases, different configurations may have or be associated with different parameter setups (e.g., different resources, different demodulation reference signal (DMRS), cyclic shift (CS)/interleaved frequency division multiple access (iFDMA)/pattern, etc.). A base station 105 may determine how to trade off latency and implementation complexity. If one configuration is indicated to a UE, a fixed repetition window may be implemented as described herein. As the number of configurations increases, latency may be reduced, but the number of testable repetition window hypotheses for the base station 105 goes up. Per TTI, the number of hypotheses may, in some cases, correspond to K as configured (e.g., in a configuration message) in the repetition window configurations. In some cases, a base station 105 may set P=K, and configure P=K repetition window configurations. In such cases, a dynamic sliding repetition window may be implemented as described herein, and the base station 105 may perform hypothesis testing.

Figure 5:
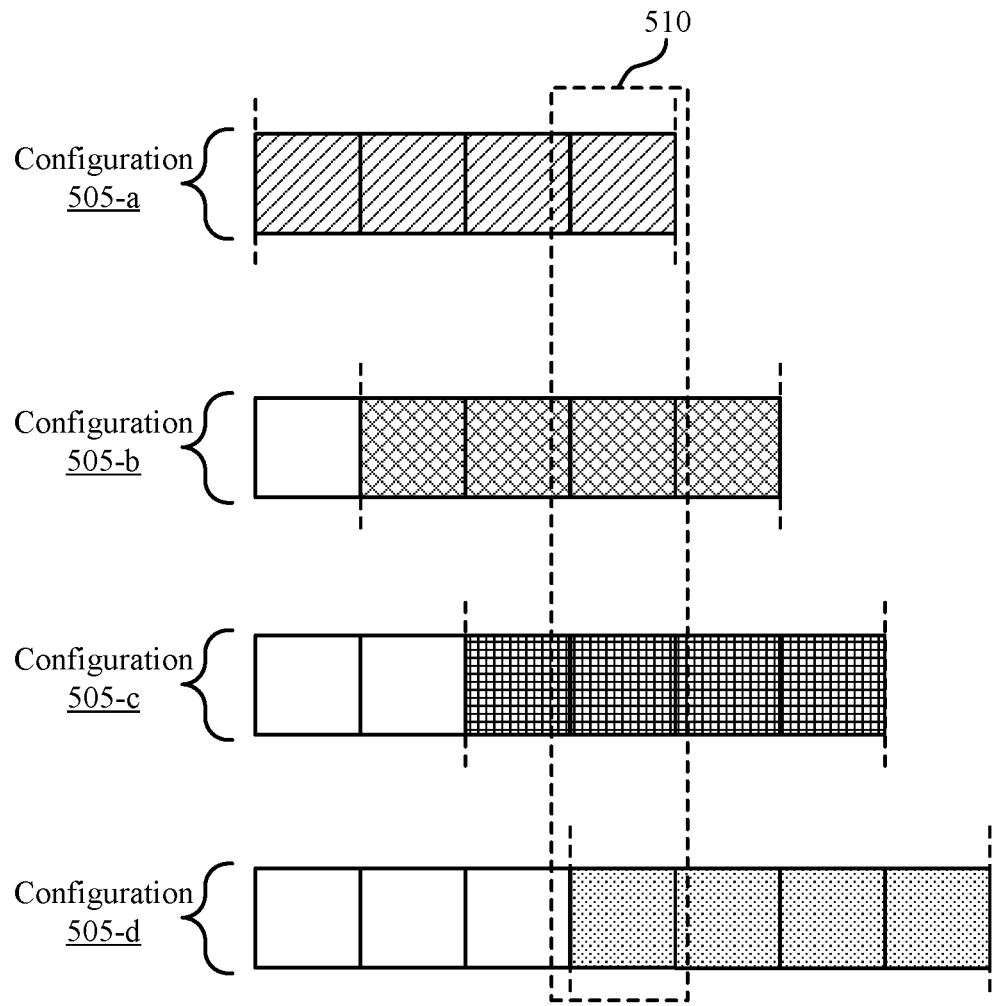

FIG. 5 illustrates examples of repetition window configurations 500 that support repetition-based transmissions for uplink URLLC in accordance with aspects of the present disclosure. In some examples, repetition window configurations 500 may implement aspects of wireless communications system 100 and wireless communications system 300.

A base station 105 may determine the set of repetition window configurations usable by a UE 115 based on target latency and implementation complexity considerations. For example, a set of repetition window configurations may be determined or configured by a base station 105 such that the UE 115 may have more or less first transport block transmission opportunities (e.g., according to latency considerations), more or less transport block repetitions within a repetition window (e.g., according to reliability considerations), etc. However, as latency is reduced and reliability is increased for such repetition-based transmissions, the number of hypotheses tested in order for the base station 105 to determine the correct repetition window configuration used by the UE 115 may increase (e.g., as discussed in more detail below), which may increase implementation complexity. For latency considerations, the earlier the packet or transport block is transmitted the less delay (e.g., to prioritize latency, a packet may be sent at the first available uplink opportunity or at the first transmission occasion without delay). For reliability considerations, a certain number of repetitions may be guaranteed for a given packet size and UE condition.

However, as the number of transmission occasions and the number of repetitions within a repetition window are increased, the number of repetition window configuration hypotheses tested by the base station 105 may also increase. For example, the reductions in latency arising from a UE 115 being able to transmit in any sTTI (e.g., due to repetition window configurations being provided for each transmission occasion) and increased reliability (e.g., due to allowing K repetitions within a repetition window) may result in a floating window 510 described in more detail below.

In the example of FIG. 5, four repetition windows may be configured with K=4. A base station 105 receiving a transport block in floating window 510 (e.g., when having configured the UE 115 with configuration 505-a, configuration 505-b, configuration 505-c, and configuration 505-d via a configuration message) may check up to four hypotheses. For example, the received transmission may be the first transmission of configuration 505-d, the second transmission of configuration 505-c (e.g., the first transmission may have been missed), the third transmission of configuration 505-b (e.g., the first and second transmissions may have been missed), or the fourth transmission of configuration 505-a (e.g., the first, second, and third transmissions may have been missed). In some cases, at each TTI, the base station may need to check K scenarios or K repetition configuration hypotheses.

Figure 6:
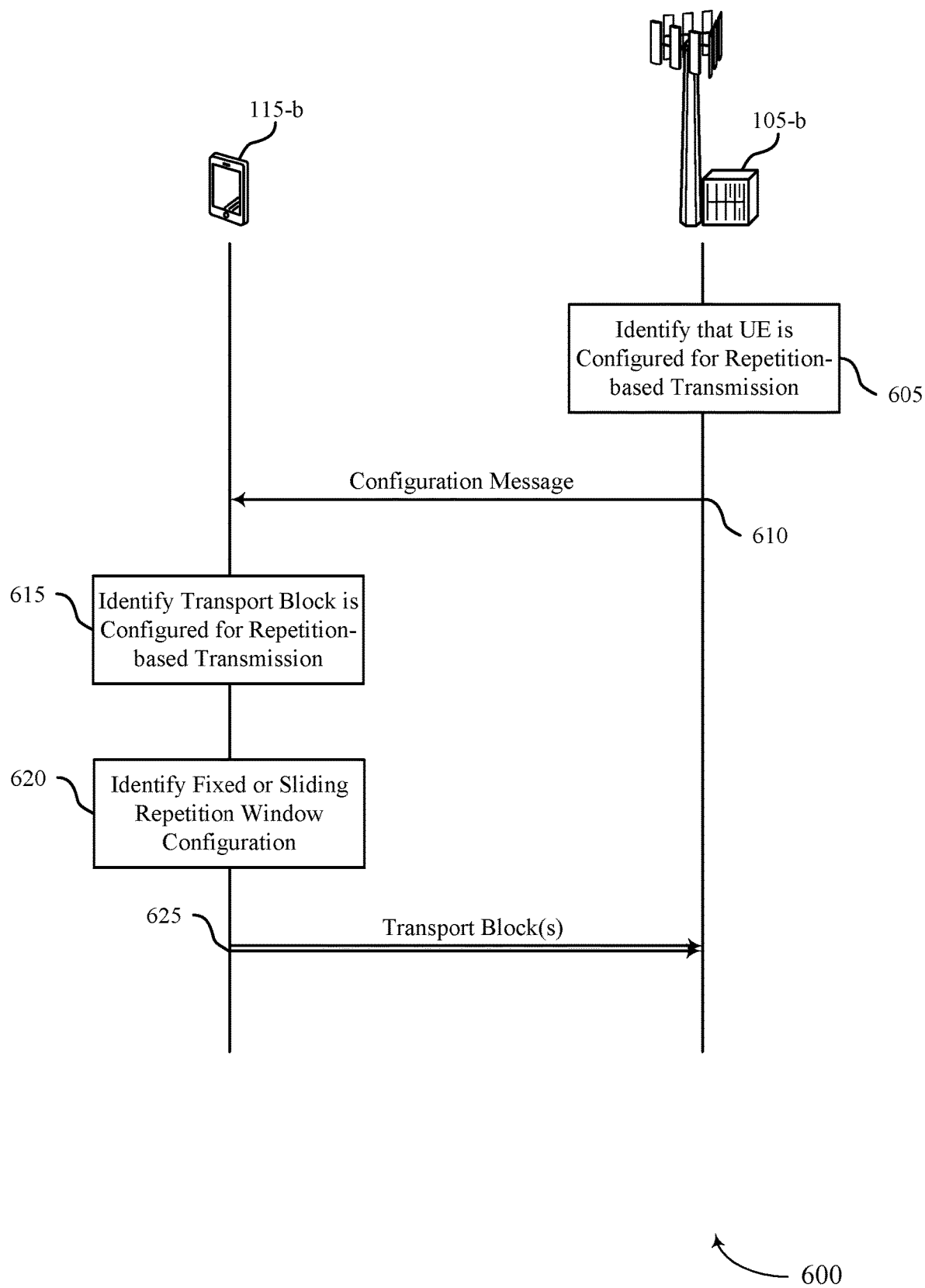
FIGS. 6 and 7 illustrate example process flows that support repetition-based transmissions for uplink URLLC in accordance with aspects of the present disclosure.

FIG. 6 illustrates an example of a process flow 600 that supports repetition-based transmissions for uplink URLLC in accordance with aspects of the present disclosure. In some examples, process flow 600 may implement aspects of wireless communications system 100 and/or wireless communications system 300. Process flow 600 includes base station 105-b and UE 115-b, which may be examples of base stations 105 and UEs 115 as described with reference to FIGS. 1 and 3. Process flow 600 may illustrate UE 115-b identifying whether to use a fixed repetition window or a sliding repetition window based on a configuration message received from base station 105-b. In the following description of the process flow 600, the operations between the UE 115-b and the base station 105-b may be transmitted in a different order than the exemplary order shown, or the operations performed by UE 115-b and base station 105-b may be performed in different orders or at different times. In some cases, certain operations may also be left out of the process flow 600, or other operations may be added to the process flow 600.

At 605, base station 105-b may identify that a UE is configured for repetition-based transmission (e.g., for a URLLC transmission). At 610, base station 105-b may transmit, to UE 115-b, a configuration message that includes an indication of whether the UE 115-b is to use a fixed repetition window or a sliding repetition window in repetition-based transmissions. In some cases, base station 105-b may determine whether the indication included in the configuration message is to indicate that the UE 115-b is to use a fixed repetition window or a sliding repetition window based at least in part on a number of repetitions to be included in the repetition-based transmission, an MCS of the repetition-based transmission, a packet size of the repetition-based transmission, and/or UE channel conditions.

At 615, UE 115-b may identify that the UE 115-b is configured for repetition-based transmission of a transport block within a repetition window. At 620, UE 115-b may identify whether it is configured to use a fixed repetition window or a sliding repetition window for repetition-based transmissions (e.g., based on the configuration message received at 610). In some cases, UE 115-b may determine whether to use a fixed repetition window or a sliding repetition window based on a number of repetitions to be included in the repetition-based transmission, an MCS of the repetition-based transmission, a packet size of the repetition-based transmission, and/or UE channel conditions. At 625, UE 115-b may transmit the transport block, in an initial transmission, within the first TTI of the repetition window. In some cases, the UE 115-b may also transmit one or more transport block repetitions in subsequent TTIs of the repetition window. In some cases, the first TTI of the repetition window is based on whether the repetition window is a fixed repetition window or a sliding repetition window (e.g., as determined at 620).

In cases where the UE 115-b identifies (e.g., at 620) that it is to use a fixed repetition window, UE 115-b may delay initial transmission of the transport block until the first TTI of the repetition window, and the transport block transmission at 625 may be performed at the next available repetition window. In cases where the UE 115-b identifies (e.g., at 620) that it is to use a sliding repetition window, UE 115-b may transmit the transport block, in its initial transmission, in a next available TTI, and the transport block transmission at 625 may be performed at one of the first TTI or one of the subsequent TTIs of the repetition window. In some cases, a length of the repetition window, in TTIs, is a periodicity of the repetition window. In some cases, a number of transmission repetitions of the transport block is equal to the periodicity of the repetition window. In some cases, the number of transmission repetitions of the transport block is based at least in part on a packet size of the repetition-based transmission and a UE channel condition quality.

Figure 7:
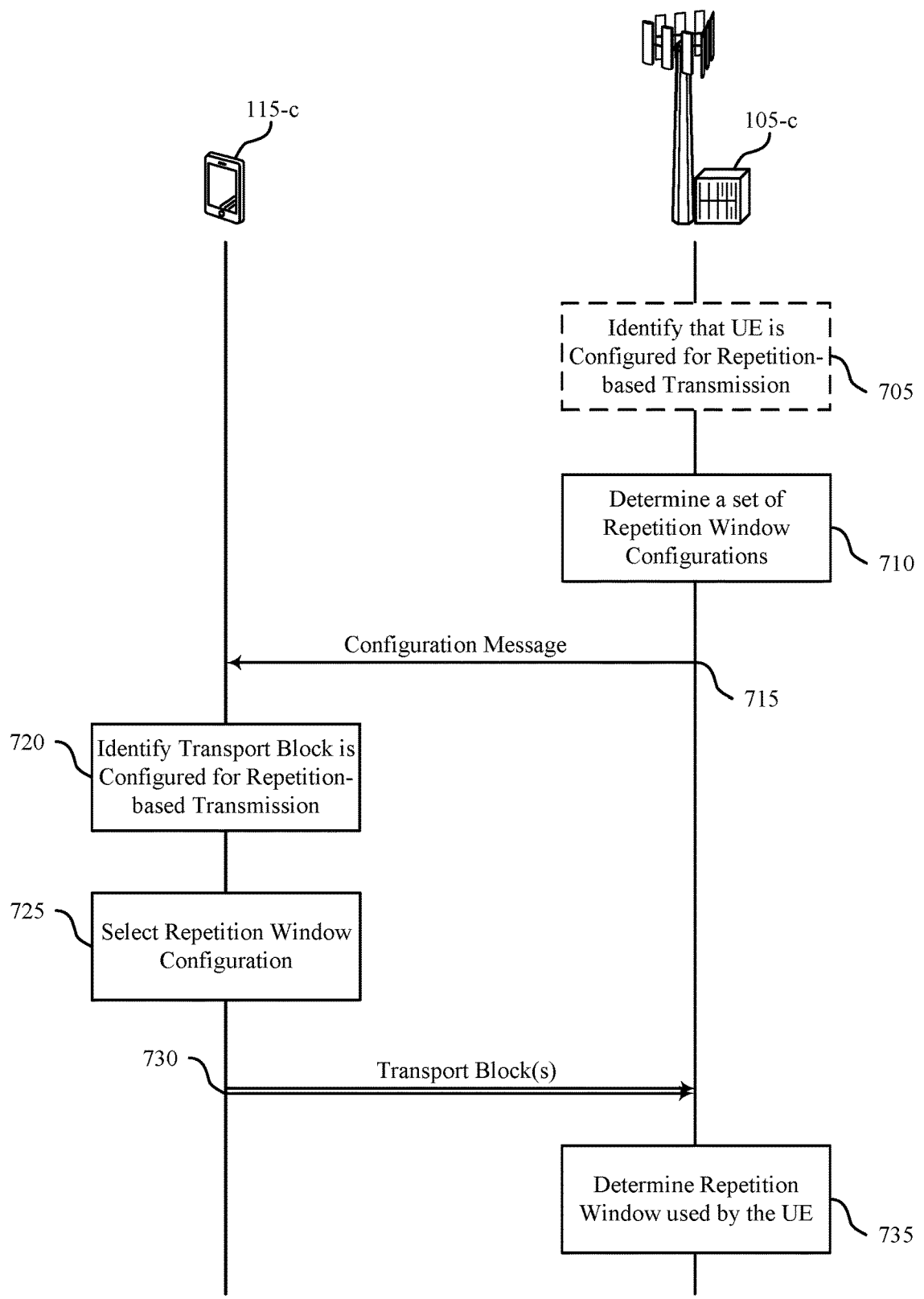

FIG. 7 illustrates an example of a process flow 700 that supports repetition-based transmissions for uplink URLLC in accordance with aspects of the present disclosure. In some examples, process flow 700 may implement aspects of wireless communications system 100 and/or wireless communications system 300. Process flow 700 includes base station 105-c and UE 115-c, which may be examples of base stations 105 and UEs 115 as described with reference to FIGS. 1 and 3. Process flow 700 may illustrate a base station 105-c determining and configuring UE 115-c with a set of repetition window configurations, where the UE 115-c may then select one of the configured repetition window configurations upon identifying a transport block configured for repetition-based transmission. In the following description of the process flow 700, the operations between the UE 115-c and the base station 105-c may be transmitted in a different order than the exemplary order shown, or the operations performed by UE 115-c and base station 105-c may be performed in different orders or at different times. In some cases, certain operations may also be left out of the process flow 700, or other operations may be added to the process flow 700.

At 705, base station 105-c may, in some cases, identify that UE 115-c is configured for repetition-based transmission (e.g., a URLLC transmission). At 710, base station 105-c may determine a set (e.g., a plurality) of repetition window configurations for repetition-based transmissions. For example, base station 105-c may determine, for each of the set or plurality of repetition window configurations, a number of transport block transmission repetitions, a repetition window periodicity, and a repetition window offset (e.g., repetition window configurations may be associated with different P values, K values, and/or transmission occasions). In other examples, base station 105-c may determine a number of transport block transmission repetitions and a repetition window periodicity for the set of measurement configurations, as well as determine, for each of the plurality of repetition window configurations, a repetition window offset (e.g., repetition window configurations may all be associated with the same P value and K value, but may be associated with different transmission occasions).

In some cases, base station 105-c may adjust number of repetition window configurations included in the set of repetition window configurations sent to UE 115-c (e.g., at 715). For example, the number of repetition window configurations included in the set of repetition window configurations may be increased (e.g., to improve latency) when a target latency metric drops below (or goes above) a threshold. In some cases, the number of repetition window configurations included in the set of repetition window configurations may be adjusted based on a packet size of the repetition-based transmission satisfying a packet size threshold, an MCS of the repetition-based transmission satisfying an MCS threshold, and/or a UE channel condition quality satisfying a quality threshold.

At 715, base station 105-c may transmit a configuration message including the set of repetition window configurations to UE 115-c. As discussed above, base station 105-c may determine repetition window configurations (e.g., determine K values, P values, and/or offsets associated with one or more repetition window configurations) and/or determine which, or how many, repetition window configurations to include in the configuration message according to a desired implementation (e.g., according to latency and implementation complexity considerations). At 720, UE 115-c may identify that the UE 115-c is configured for repetition-based transmission of a transport block within a repetition window.

At 725, UE 115-c may select a repetition window configuration from the set of repetition window configurations included in the configuration message received at 715. In some examples, the UE 115-c may select the repetition window configuration based on one or more elements of the repetition window configuration, the one or more elements including a number of transmission repetitions of the transport block, a periodicity of the repetition window, an offset of the repetition window, etc. In some cases, UE 115-c may identify a first transport block transmission occasion based at least in part on an availability of the identified transport block for transmission and select the repetition window configuration from the set of repetition window configurations based on the identified first transport block transmission occasion. For example, after identifying the transport block is configured for repetition-based transmission at 720, UE 115-c may select a repetition window configuration from the set of repetition window configurations that is associated with the earliest or soonest transmission occasion (e.g., or transport block transmission opportunity). In other words, the UE 115-c may identify the transport block at 720, identify a desired transmission occasion (e.g., which may be the next transmission occasion, or some other transmission occasion identified for other considerations), and select a repetition window configuration that includes an offset associate with the desired transmission occasion.

In some cases, a length of the repetition window, in TTIs, is equal to a periodicity of the repetition window. In some cases, a number of transmission repetitions of the transport block is equal to the periodicity of the repetition window. Additionally, a number of transmission repetitions of the transport block may be based on a packet size of the repetition-based transmission and a UE channel condition quality. At 730, UE 115-c may transmit the transport block, in an initial transmission, within the first TTI of the repetition window (e.g., as defined by the repetition window configuration selected at 725). In some cases, the UE 115-c may also transmit one or more transport block repetitions in subsequent TTIs of the repetition window (e.g., as defined by the repetition window configuration selected at 725).

At 735, base station 105-c may determine a repetition window used by the UE 115-c to transmit the transport block at 730 (e.g., and the one or more repetitions of the transport block). In some cases, the base station 105-c may test a number of repetition window hypotheses corresponding to at least some of the plurality of repetition window configurations in order to determine the repetition window used by the UE 115-c (e.g., the number of tested hypotheses may depend on those of the plurality of repetition window configurations that include transmission opportunities associated with a TTI in which the transport block is received). The base station 105-c may determine the repetition window used by UE 115-c based on the hypothesis testing and may identify a first TTI and subsequent TTIs (e.g., or a first sTTI and subsequent sTTIs) based on the determination. The base station 105-c may receive one or more additional repeated transport blocks based on the identified subsequent TTIs (e.g., according to the number of repetitions associated with the repetition window configuration that was selected by the UE at 725).

Figure 8:
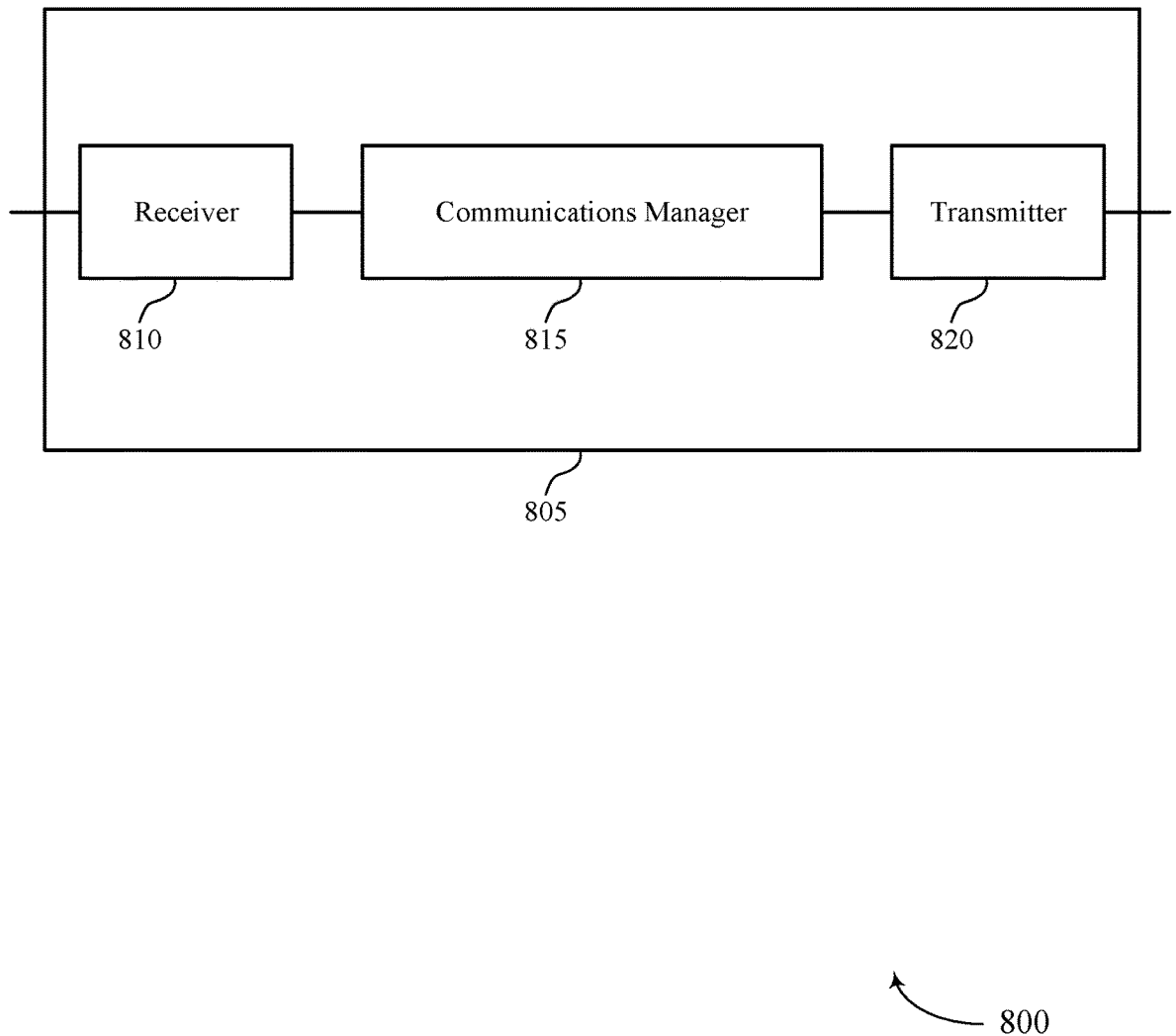
FIGS. 8 and 9 show block diagrams of devices that support repetition-based transmissions for uplink URLLC in accordance with aspects of the present disclosure.

FIG. 8 shows a block diagram 800 of a device 805 that supports repetition-based transmissions for uplink URLLC in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to repetition-based transmissions for uplink URLLC, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may identify that the device 805 is configured for repetition-based transmission of a transport block within a repetition window, the repetition window including a first TTI and subsequent TTIs. The communications manager 815 may transmit the transport block, in an initial transmission, within the first TTI of the repetition window, where the first TTI of the repetition window is based on whether the repetition window is a fixed repetition window or a sliding repetition window. The communications manager 815 may identify whether the UE is configured to use a fixed repetition window or a sliding repetition window for repetition-based transmissions.

The communications manager 815 may also identify that the device 805 is configured for repetition-based transmission of a transport block within a repetition window, the repetition window including a first TTI and subsequent TTIs. The communications manager 815 may select a repetition window configuration from a set of repetition window configurations. The communications manager 815 may transmit the transport block in an initial transmission within the first TTI of the repetition window, where the repetition window is based on the selected repetition window configuration. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
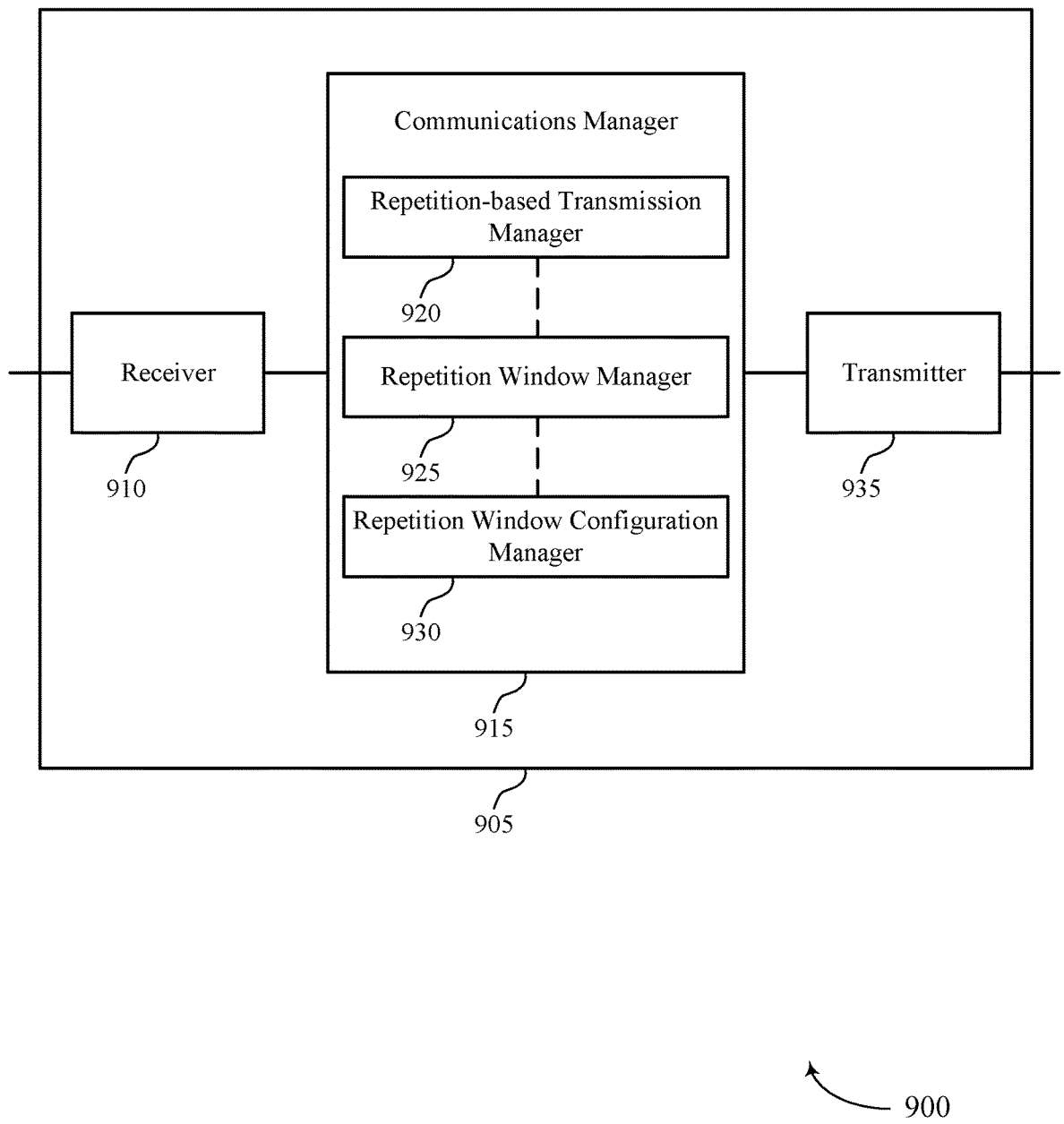

FIG. 9 shows a block diagram 900 of a device 905 that supports repetition-based transmissions for uplink URLLC in accordance with aspects of the present disclosure. The device 905 may be an example of aspects of a device 805 or a UE 115 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to repetition-based transmissions for uplink URLLC, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a repetition-based transmission manager 920, a repetition window manager 925, and a repetition window configuration manager 930. The communications manager 915 may be an example of aspects of the communications manager 1110 described herein.

The repetition-based transmission manager 920 may identify that device 905 is configured for repetition-based transmission of a transport block within a repetition window, the repetition window including a first TTI and subsequent TTIs. The repetition-based transmission manager 920 may transmit the transport block, in an initial transmission, within the first TTI of the repetition window, where the first TTI of the repetition window is based on whether the repetition window is a fixed repetition window or a sliding repetition window.

The repetition window manager 925 may identify whether the UE is configured to use a fixed repetition window or a sliding repetition window for repetition-based transmissions. The repetition-based transmission manager 920 may identify that device 905 is configured for repetition-based transmission of a transport block within a repetition window, the repetition window including a first TTI and subsequent TTIs and transmit the transport block in an initial transmission within the first TTI of the repetition window, where the repetition window is based on the selected repetition window configuration. The repetition window configuration manager 930 may select a repetition window configuration from a set of repetition window configurations.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
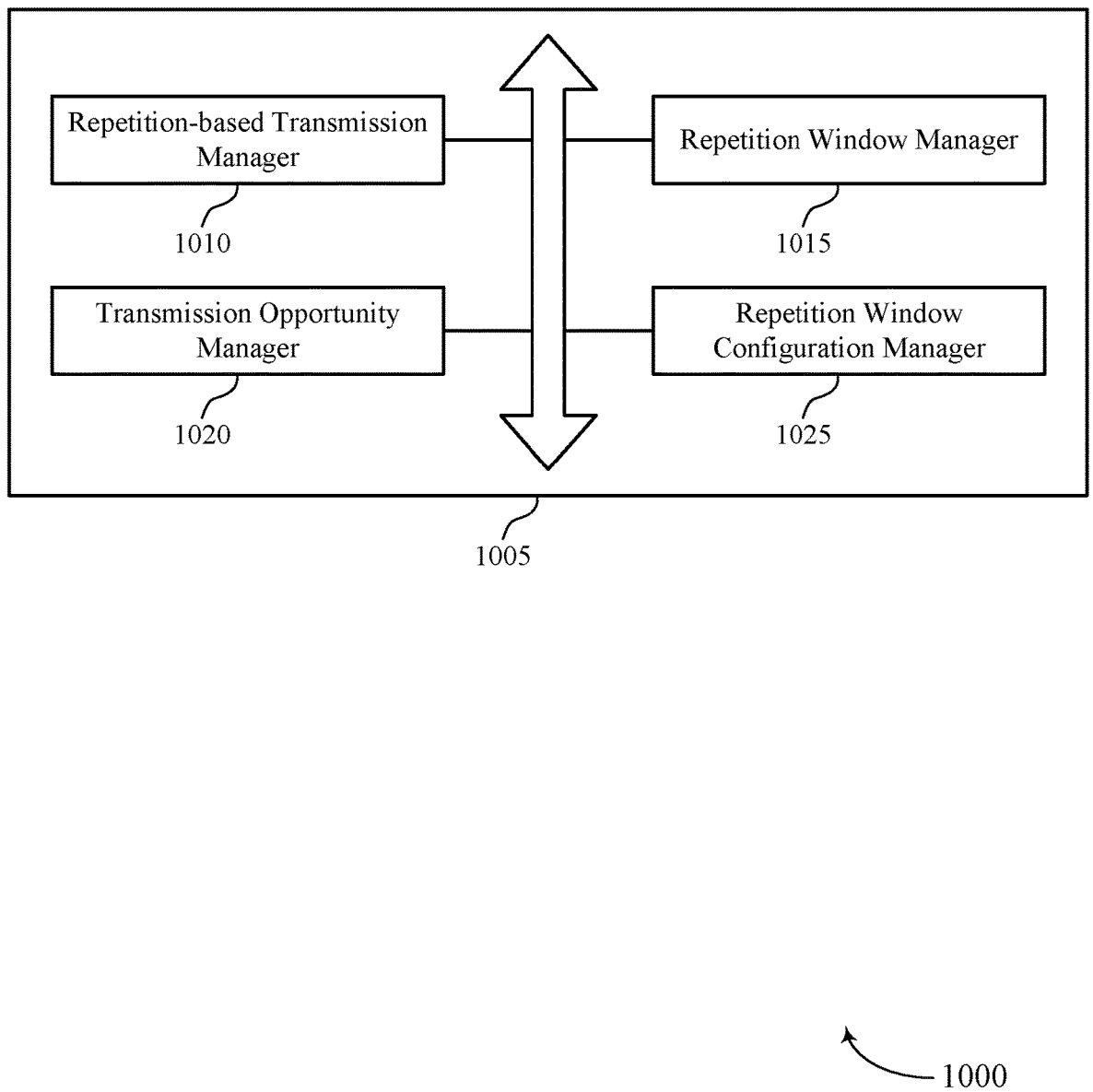
FIG. 10 shows a block diagram of a communications manager that supports repetition-based transmissions for uplink URLLC in accordance with aspects of the present disclosure.

FIG. 10 shows a block diagram 1000 of a communications manager 1005 that supports repetition-based transmissions for uplink URLLC in accordance with aspects of the present disclosure. The communications manager 1005 may be an example of aspects of a communications manager 815, a communications manager 915, or a communications manager 1110 described herein. The communications manager 1005 may include a repetition-based transmission manager 1010, a repetition window manager 1015, a transmission opportunity manager 1020, and a repetition window configuration manager 1025. Each of these modules may communicate, directly or indirectly, with one another (e.g., via one or more buses).

The repetition-based transmission manager 1010 may identify that a transport block is configured for repetition-based transmission within a repetition window, the repetition window including a first TTI and subsequent TTIs. In some examples, the repetition-based transmission manager 1010 may transmit the transport block, in an initial transmission, within the first TTI of the repetition window, where the first TTI of the repetition window is based on whether the repetition window is a fixed repetition window or a sliding repetition window.

In some examples, the repetition-based transmission manager 1010 may transmit the transport block in an initial transmission within the first TTI of the repetition window, where the repetition window is based on the selected repetition window configuration. In some examples, the repetition-based transmission manager 1010 may identify that the UE is to use a fixed repetition window. In some examples, the repetition-based transmission manager 1010 may identify that the UE is to use a sliding repetition window.

The repetition window manager 1015 may identify whether the UE is configured to use a fixed repetition window or a sliding repetition window for repetition-based transmissions. In some examples, the repetition window manager 1015 may receive a configuration message that includes an indication of whether the UE is to use a fixed repetition window or a sliding repetition window. In some examples, the repetition window manager 1015 may determine whether the UE is to use a fixed repetition window or a sliding repetition window based on a number of repetitions to be included in the repetition-based transmission, a MCS of the repetition-based transmission, a packet size of the repetition-based transmission, UE channel conditions, or combinations thereof.

In some examples, the repetition window manager 1015 may determine that the UE is to use a fixed repetition window based on a packet size of the repetition-based transmission being less than a packet size threshold, a MCS of the repetition-based transmission being less than an MCS threshold, a UE channel condition quality being greater than a quality threshold, or combinations thereof. In some examples, the repetition window manager 1015 may determine that the UE is to use a sliding repetition window based on a packet size of the repetition-based transmission being greater than a packet size threshold, a MCS of the repetition-based transmission being greater than an MCS threshold, a UE channel condition quality being lesser than a quality threshold, or combinations thereof.

In some examples, the repetition window manager 1015 may select the repetition window configuration based on one or more elements of the repetition window configuration, the one or more elements including at least one of a number of transmission repetitions of the transport block, a periodicity of the repetition window, or an offset of the repetition window. In some examples, the repetition window manager 1015 may determine a set of TTIs corresponding to the repetition window configuration based on the one or more elements, where the repetition window configuration is selected based on the set of TTIs corresponding to the repetition window configuration. In some examples, the repetition window manager 1015 may select the repetition window configuration based on an offset of the repetition window defined by the repetition window configuration. In some cases, a length of the repetition window, in TTIs, is a periodicity of the repetition window. In some cases, a number of transmission repetitions of the transport block is equal to the periodicity of the repetition window. In some cases, a number of transmission repetitions of the transport block is based on a packet size of the repetition-based transmission and a UE channel condition quality.

The repetition window configuration manager 1025 may select a repetition window configuration from a set of repetition window configurations. In some examples, the repetition window configuration manager 1025 may receive a configuration message that includes the set of repetition window configurations. In some cases, a length of the repetition window, in TTIs, is equal to a periodicity of the repetition window, and where a number of transmission repetitions of the transport block is equal to the periodicity of the repetition window. In some cases, a number of transmission repetitions of the transport block is based on a packet size of the repetition-based transmission and a UE channel condition quality.

The transmission opportunity manager 1020 may delay initial transmission of the transport block until the first TTI of the repetition window, where the repetition window is a next available repetition window. In some examples, the transmission opportunity manager 1020 may transmit the transport block, in its initial transmission, in a next available TTI, where the next available TTI is one of the first TTI or one of the subsequent TTIs of the repetition window. In some examples, the transmission opportunity manager 1020 may identify a first transport block transmission occasion based on an availability of the identified transport block for transmission, where the repetition window configuration is selected based on the first transport block transmission occasion.

In some examples, the repetition window configuration manager 1025 may determine that the repetition window configuration corresponds to a set of TTIs including the first TTI that is the same as a TTI in which the transport block is ready for transmission or that is closest to the TTI in which the transport block is ready for transmission (e.g., closest in time compared to the initial TTIs of all the other repetition window configurations). The repetition window configuration manager 1025 may then select the repetition window configuration based on the determining. In some examples, each repetition window configuration is associated with a respective resource set, DMRS pattern, CS pattern, FDMA pattern, or a combination thereof.

Figure 11:
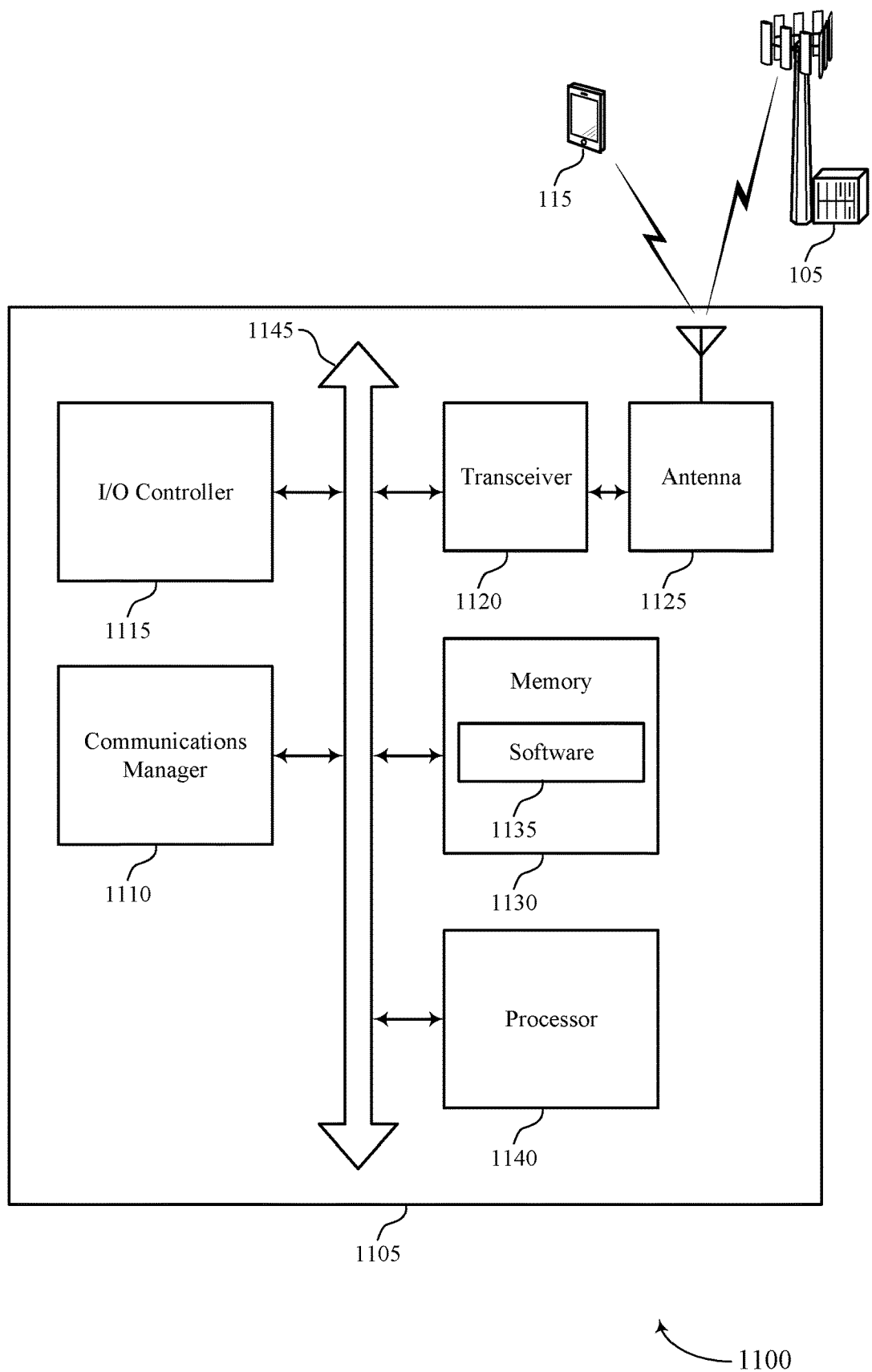
FIG. 11 shows a diagram of a system including a device that supports repetition-based transmissions for uplink URLLC in accordance with aspects of the present disclosure.

FIG. 11 shows a diagram of a system 1100 including a device 1105 that supports repetition-based transmissions for uplink URLLC in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may identify that a transport block is configured for repetition-based transmission within a repetition window, the repetition window including a first TTI and subsequent TTIs, transmit the transport block, in an initial transmission, within the first TTI of the repetition window, where the first TTI of the repetition window is based on whether the repetition window is a fixed repetition window or a sliding repetition window. The communications manager 1110 may identify whether the UE is configured to use a fixed repetition window or a sliding repetition window for repetition-based transmissions. The communications manager 1110 may also identify that a transport block is configured for repetition-based transmission within a repetition window, the repetition window including a first TTI and subsequent TTIs. The communications manager 1110 may select a repetition window configuration from a set of repetition window configurations. The communications manager 1110 may transmit the transport block in an initial transmission within the first TTI of the repetition window, where the repetition window is based on the selected repetition window configuration.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM and ROM. The memory 1130 may store computer-readable, computer-executable software 1135 including instructions that, when executed, cause the processor to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting repetition-based transmissions for uplink URLLC).

Software 1135 may include code to implement aspects of the present disclosure, including code to support increasing physical random access capacity using orthogonal cover codes. Software 1135 may be stored in a non-transitory computer-readable medium such as system memory or other memory. In some cases, the software 1135 may not be directly executable by the processor but may cause a computer (e.g., when compiled and executed) to perform functions described herein.

Figure 12:
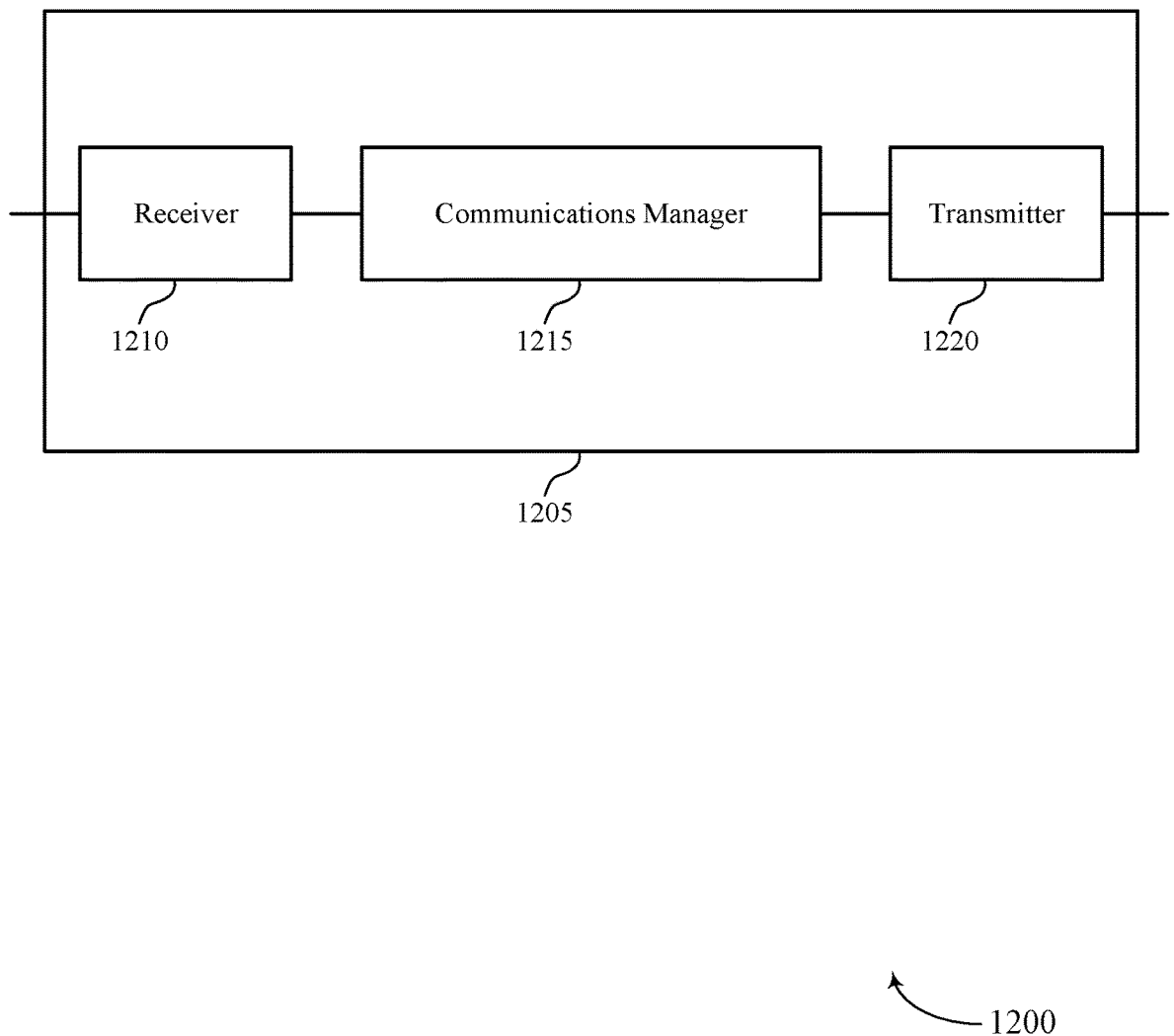
FIGS. 12 and 13 show block diagrams of devices that support repetition-based transmissions for uplink URLLC in accordance with aspects of the present disclosure.

FIG. 12 shows a block diagram 1200 of a device 1205 that supports repetition-based transmissions for uplink URLLC in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to repetition-based transmissions for uplink URLLC, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may identify that a UE is configured for repetition-based transmission, receive a transport block transmitted from the UE in accordance with the configuration message, and transmit, to the UE, a configuration message that includes an indication of whether the UE is to use a fixed repetition window or a sliding repetition window in repetition-based transmissions. The communications manager 1215 may also determine a set of repetition window configurations for repetition-based transmissions, transmit, to a UE, a configuration message that includes the set of repetition window configurations, and receive a transport block transmitted from the UE in accordance with one of the set of repetition window configurations. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
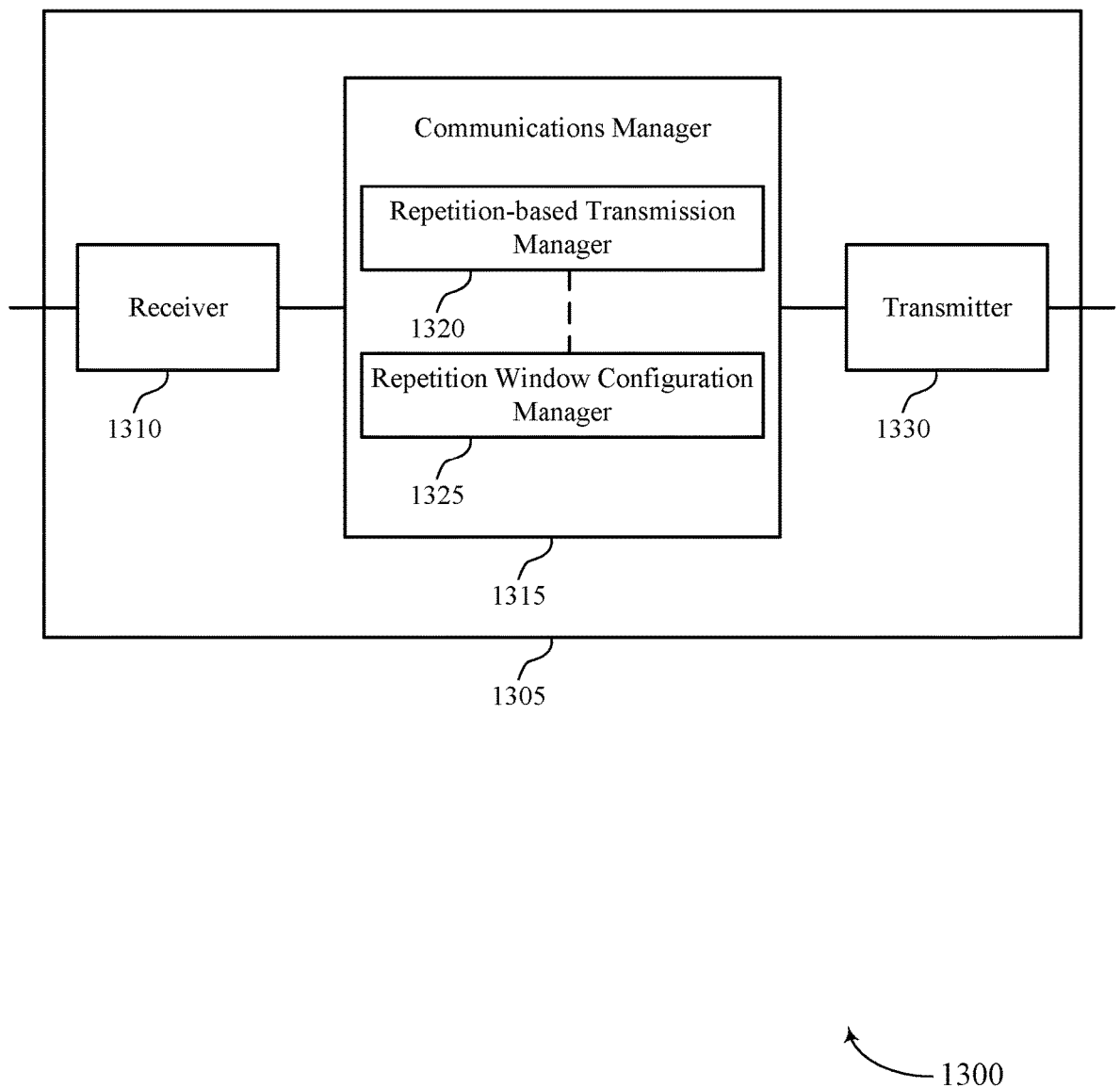

FIG. 13 shows a block diagram 1300 of a device 1305 that supports repetition-based transmissions for uplink URLLC in accordance with aspects of the present disclosure. The device 1305 may be an example of aspects of a device 1205 or a base station 105 as described herein. The device 1305 may include a receiver 1310, a communications manager 1315, and a transmitter 1330. The device 1305 may also include a processor. Each of these components may be in communication with one another (e.g., via one or more buses).

The receiver 1310 may receive information such as packets, user data, or control information associated with various information channels (e.g., control channels, data channels, and information related to repetition-based transmissions for uplink URLLC, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a repetition-based transmission manager 1320 and a repetition window configuration manager 1325. The communications manager 1315 may be an example of aspects of the communications manager 1510 described herein.

The repetition-based transmission manager 1320 may identify that a UE is configured for repetition-based transmission and receive a transport block transmitted from the UE in accordance with the configuration message. The repetition window configuration manager 1325 may transmit, to the UE, a configuration message that includes an indication of whether the UE is to use a fixed repetition window or a sliding repetition window in repetition-based transmissions. The repetition window configuration manager 1325 may determine a set of repetition window configurations for repetition-based transmissions and transmit, to a UE, a configuration message that includes the set of repetition window configurations. The repetition-based transmission manager 1320 may receive a transport block transmitted from the UE in accordance with one of the set of repetition window configurations.

The transmitter 1330 may transmit signals generated by other components of the device 1305. In some examples, the transmitter 1330 may be collocated with a receiver 1310 in a transceiver module. For example, the transmitter 1330 may be an example of aspects of the transceiver 1520 described with reference to FIG. 15. The transmitter 1330 may utilize a single antenna or a set of antennas.

Figure 14:
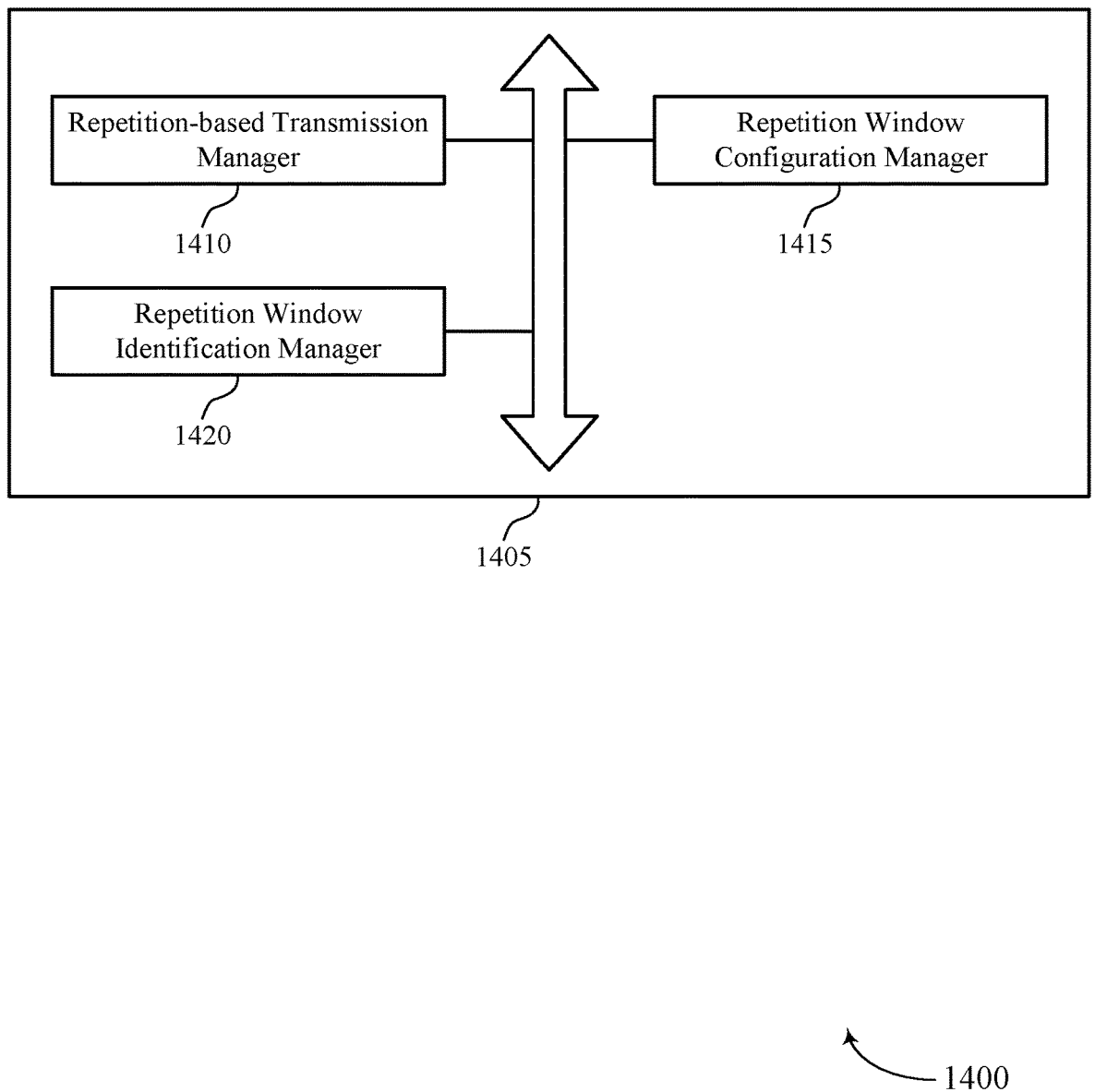
FIG. 14 shows a block diagram of a communications manager that supports repetition-based transmissions for uplink URLLC in accordance with aspects of the present disclosure.

FIG. 14 shows a block diagram 1400 of a communications manager 1405 that supports repetition-based transmissions for uplink URLLC in accordance with aspects of the present disclosure. The communications manager 1405 may be an example of aspects of a communications manager 1215, a communications manager 1315, or a communications manager 1510 described herein. The communications manager 1405 may include a repetition-based transmission manager 1410, a repetition window configuration manager 1415, and a repetition window identification manager 1420. Each of these modules may communicate, directly or indirectly, with one another (e.g., via one or more buses).

The repetition-based transmission manager 1410 may identify that a UE is configured for repetition-based transmission. In some examples, the repetition-based transmission manager 1410 may receive a transport block transmitted from the UE in accordance with the configuration message. In some examples, the repetition-based transmission manager 1410 may receive a transport block transmitted from the UE in accordance with one of the set of repetition window configurations. In some examples, the repetition-based transmission manager 1410 may receive one or more additional repeated transport blocks based on the identified subsequent TTIs. In some examples, the repetition-based transmission manager 1410 may identify that the UE is configured for repetition-based transmission, where the configuration message is transmitted to the UE based on the identification. In some cases, the transport block is received in the first TTI.

The repetition window configuration manager 1415 may transmit, to the UE, a configuration message that includes an indication of whether the UE is to use a fixed repetition window or a sliding repetition window in repetition-based transmissions. In some examples, the repetition window configuration manager 1415 may determine a set of repetition window configurations for repetition-based transmissions. In some examples, the repetition window configuration manager 1415 may transmit, to a UE, a configuration message that includes the set of repetition window configurations. In some examples, the repetition window configuration manager 1415 may determine whether the indication included in the configuration message is to indicate that the UE is to use a fixed repetition window or a sliding repetition window based on a number of repetitions to be included in the repetition-based transmission, a MCS of the repetition-based transmission, a packet size of the repetition-based transmission, UE channel conditions, or combinations thereof.

In some examples, the repetition window configuration manager 1415 may determine that the indication included in the configuration message is to indicate that the UE is to use a fixed repetition window based on a packet size of the repetition-based transmission being less than a packet size threshold, a MCS of the repetition-based transmission being less than an MCS threshold, a UE channel condition quality being greater than a quality threshold, or combinations thereof.

In some examples, the repetition window configuration manager 1415 may determine that the indication included in the configuration message is to indicate that the UE is to use a sliding repetition window based on a packet size of the repetition-based transmission being greater than a packet size threshold, a MCS of the repetition-based transmission being greater than an MCS threshold, a UE channel condition quality being lesser than a quality threshold, or combinations thereof.

In some examples, the repetition window configuration manager 1415 may adjust a number of the set of repetition window configurations included in the configuration message based on a target latency metric satisfying a threshold. In some examples, the repetition window configuration manager 1415 may adjust a number of the set of repetition window configurations included in the configuration message based on a packet size of the repetition-based transmission satisfying a packet size threshold, a MCS of the repetition-based transmission satisfying an MCS threshold, a UE channel condition quality satisfying a quality threshold, or combinations thereof.

In some examples, the repetition window configuration manager 1415 may determine, for each of the set of repetition window configurations, a number of transport block transmission repetitions, a repetition window periodicity, a repetition window offset, or combinations thereof. In some examples, the repetition window configuration manager 1415 may determine a number of transport block transmission repetitions and a repetition window periodicity for the set of repetition window configurations. In some examples, the repetition window configuration manager 1415 may determine, for each of the set of repetition window configurations, a repetition window offset. In some cases, at least one of the set of repetition window configurations is determined based on a number of repetitions to be included in the repetition-based transmission, a MCS of the repetition-based transmission, a packet size of the repetition-based transmission, UE channel conditions, or combinations thereof.

The repetition window identification manager 1420 may test a number of repetition window hypotheses corresponding to at least some of the set of repetition window configurations, where the number is based on those of the set of repetition window configurations that include transmission opportunities associated with a TTI in which the transport block is received. In some examples, the repetition window identification manager 1420 may determine a repetition window used by the UE based on the testing. In some examples, the repetition window identification manager 1420 may identify a first TTI and subsequent TTIs based on the determined repetition window.

Figure 15:
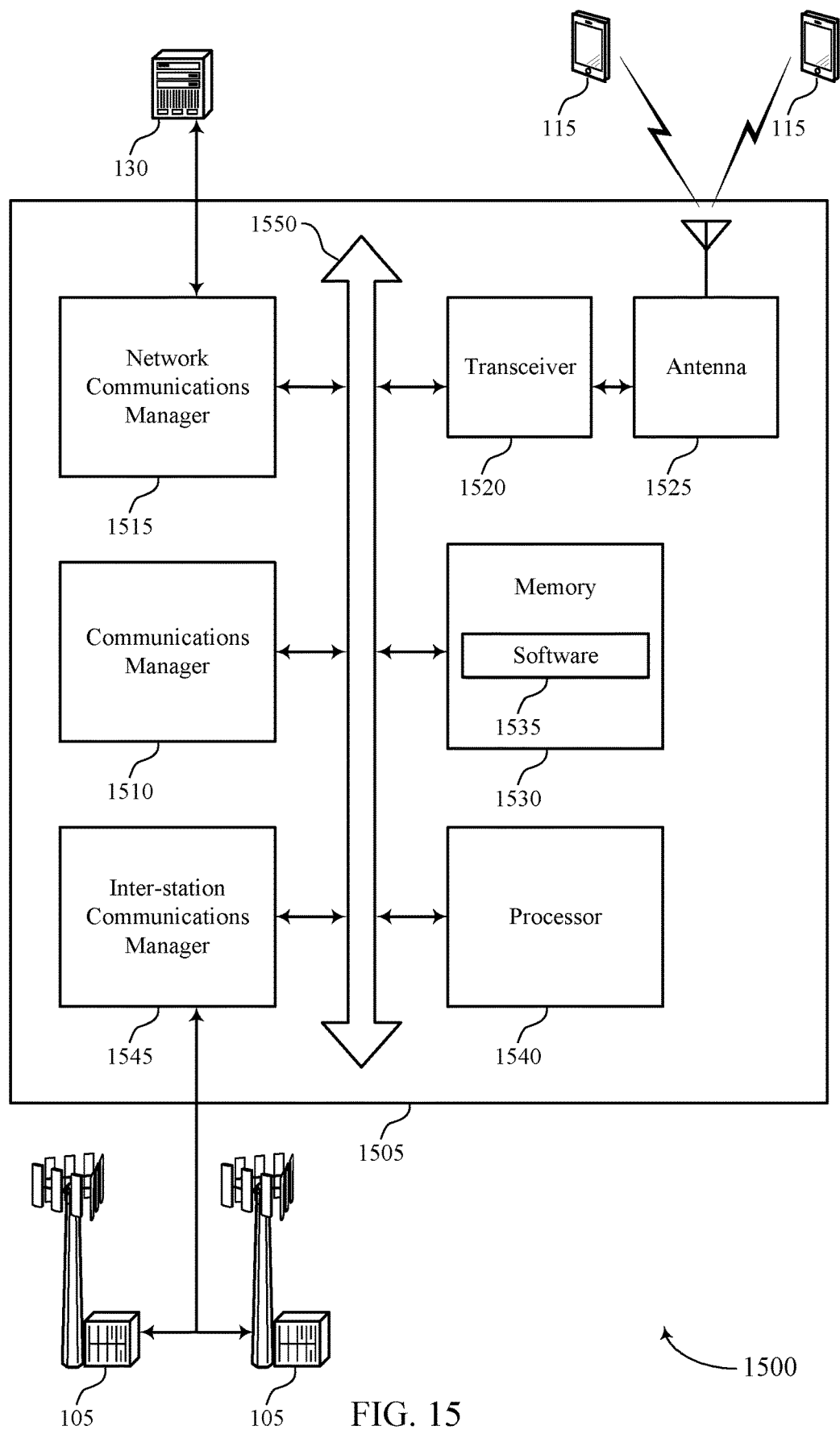
FIG. 15 shows a diagram of a system including a device that supports repetition-based transmissions for uplink URLLC in accordance with aspects of the present disclosure.

FIG. 15 shows a diagram of a system 1500 including a device 1505 that supports repetition-based transmissions for uplink URLLC in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may identify that a UE is configured for repetition-based transmission, receive a transport block transmitted from the UE in accordance with the configuration message, and transmit, to the UE, a configuration message that includes an indication of whether the UE is to use a fixed repetition window or a sliding repetition window in repetition-based transmissions. The communications manager 1510 may also determine a set of repetition window configurations for repetition-based transmissions, transmit, to a UE, a configuration message that includes the set of repetition window configurations, and receive a transport block transmitted from the UE in accordance with one of the set of repetition window configurations.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-executable software 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting repetition-based transmissions for uplink URLLC).

The inter-station communications manager 1545 may manage communications with other base station 105 and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

Software 1535 may include code to implement aspects of the present disclosure, including code to support increasing physical random-access capacity using orthogonal cover codes. Software 1535 may be stored in a non-transitory computer-readable medium such as system memory or other memory. In some cases, the software 1535 may not be directly executable by the processor but may cause a computer (e.g., when compiled and executed) to perform functions described herein.

Figure 16:
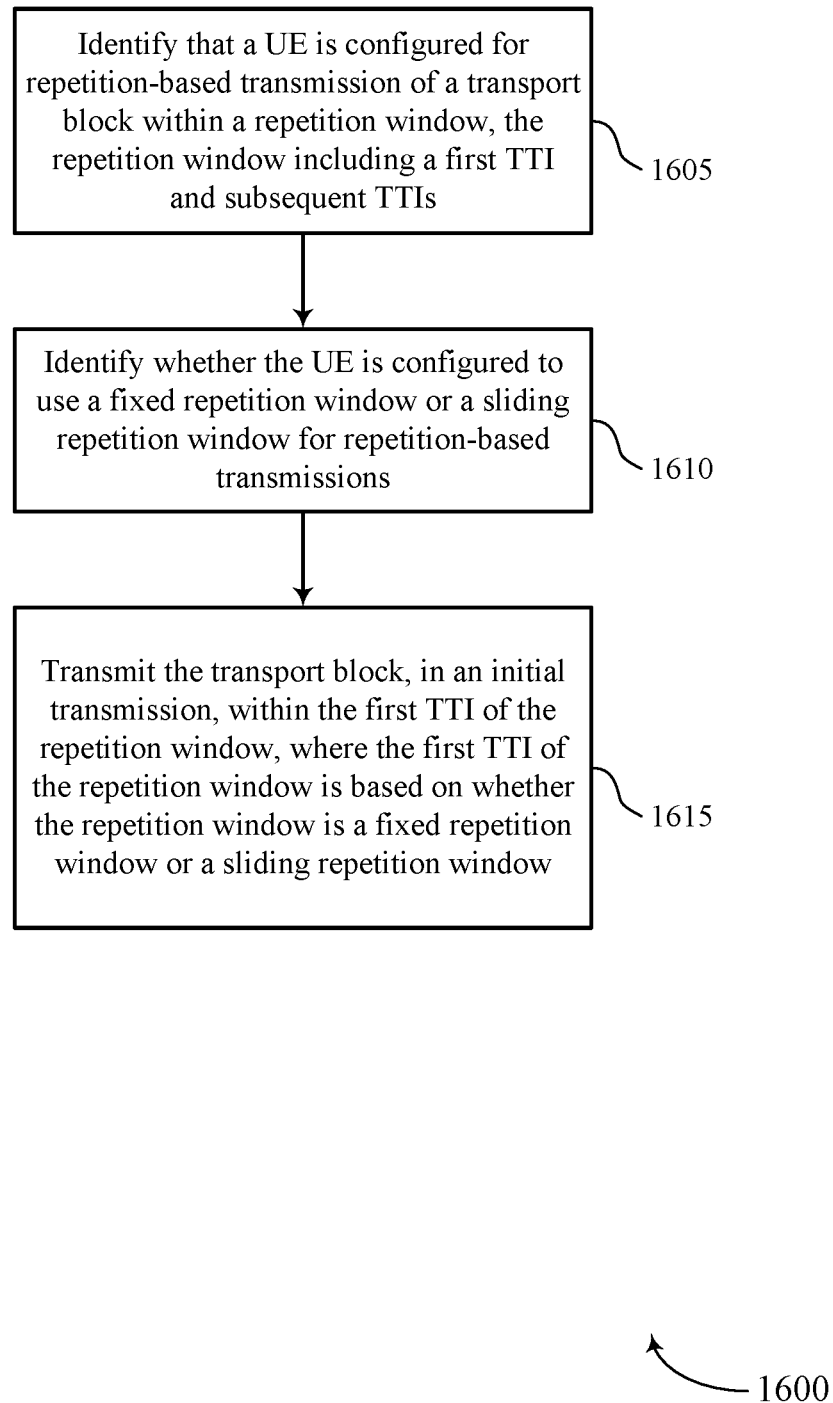
FIGS. 16 through 21 show flowcharts illustrating methods that support repetition-based transmissions for uplink URLLC in accordance with aspects of the present disclosure.

FIG. 16 shows a flowchart illustrating a method 1600 that supports repetition-based transmissions for uplink URLLC in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally, or alternatively, a UE may perform aspects of the functions described below using special-purpose hardware.

At 1605, the UE may identify that a UE is configured for repetition-based transmission of a transport block within a repetition window, the repetition window including a first TTI and subsequent TTIs. The operations of 1605 may be performed according to the methods described herein. In some examples, aspects of the operations of 1605 may be performed by a repetition-based transmission manager as described with reference to FIGS. 8 through 11.

At 1610, the UE may identify whether the UE is configured to use a fixed repetition window or a sliding repetition window for repetition-based transmissions. The operations of 1610 may be performed according to the methods described herein. In some examples, aspects of the operations of 1610 may be performed by a repetition window manager as described with reference to FIGS. 8 through 11.

At 1615, the UE may transmit the transport block, in an initial transmission, within the first TTI of the repetition window, where the first TTI of the repetition window is based on whether the repetition window is a fixed repetition window or a sliding repetition window. The operations of 1615 may be performed according to the methods described herein. In some examples, aspects of the operations of 1615 may be performed by a repetition-based transmission manager as described with reference to FIGS. 8 through 11.

Figure 17:
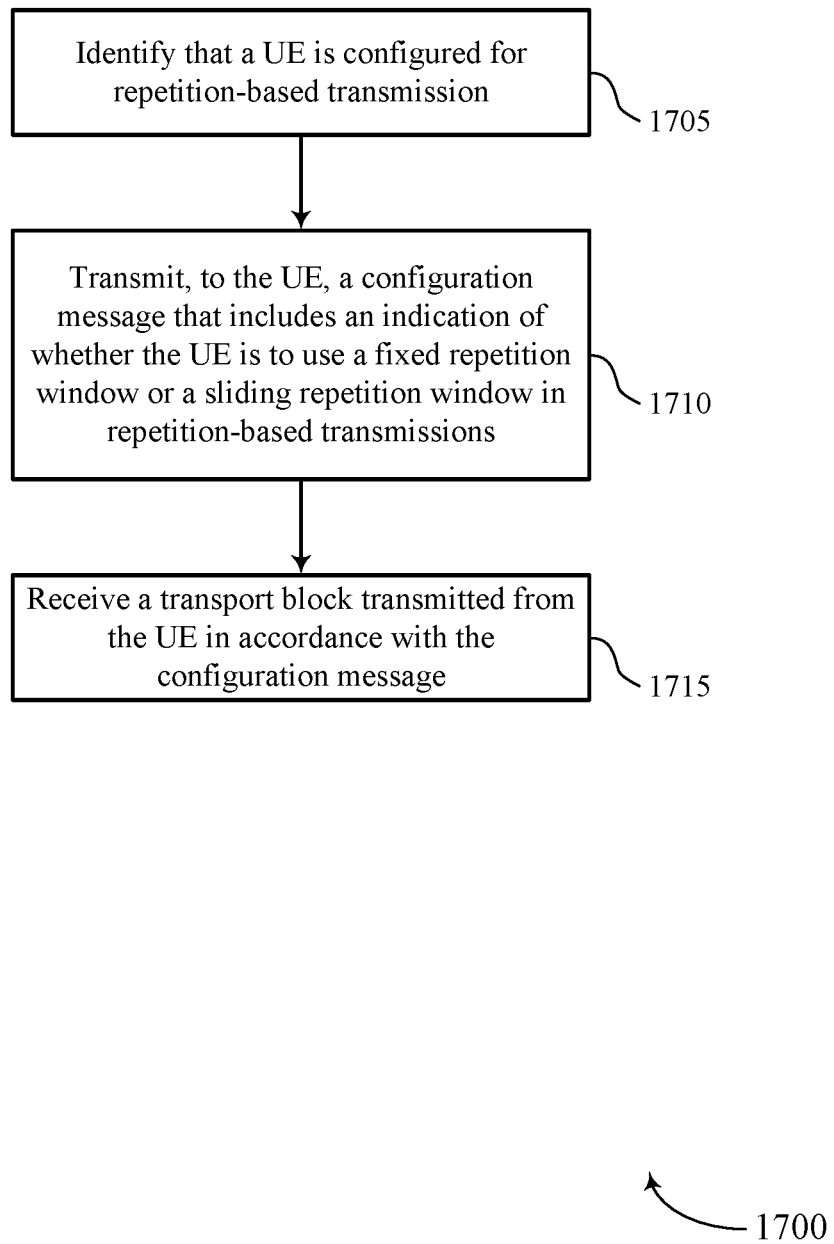

FIG. 17 shows a flowchart illustrating a method 1700 that supports repetition-based transmissions for uplink URLLC in accordance with aspects of the present disclosure. The operations of method 1700 may be implemented by a base station 105 or its components as described herein. For example, the operations of method 1700 may be performed by a communications manager as described with reference to FIGS. 12 through 15. In some examples, a base station may execute a set of instructions to control the functional elements of the base station to perform the functions described below. Additionally, or alternatively, a base station may perform aspects of the functions described below using special-purpose hardware.

At 1705, the base station may identify that a UE is configured for repetition-based transmission. The operations of 1705 may be performed according to the methods described herein. In some examples, aspects of the operations of 1705 may be performed by a repetition-based transmission manager as described with reference to FIGS. 12 through 15.

At 1710, the base station may transmit, to the UE, a configuration message that includes an indication of whether the UE is to use a fixed repetition window or a sliding repetition window in repetition-based transmissions. The operations of 1710 may be performed according to the methods described herein. In some examples, aspects of the operations of 1710 may be performed by a repetition window configuration manager as described with reference to FIGS. 12 through 15.

At 1715, the base station may receive a transport block transmitted from the UE in accordance with the configuration message. The operations of 1715 may be performed according to the methods described herein. In some examples, aspects of the operations of 1715 may be performed by a repetition-based transmission manager as described with reference to FIGS. 12 through 15.

Figure 18:
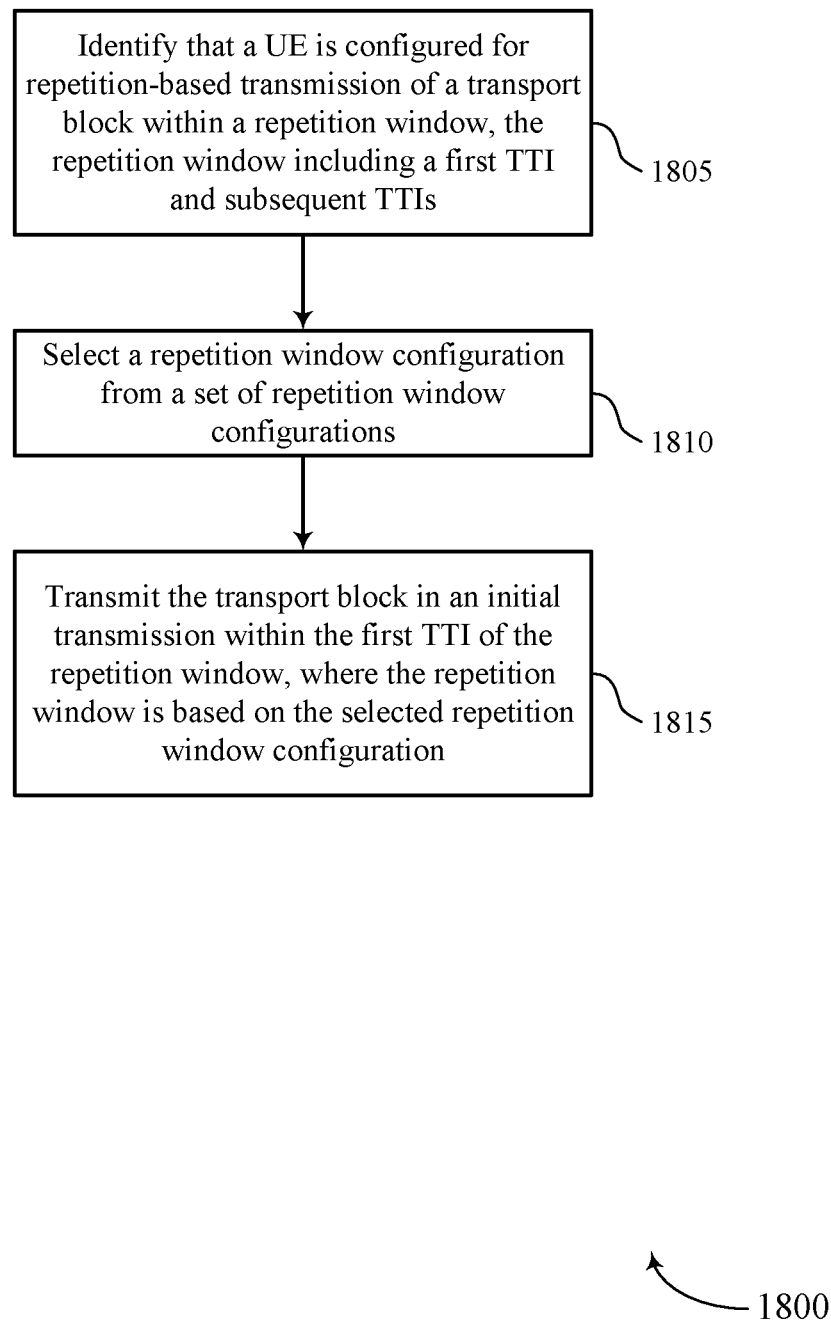

FIG. 18 shows a flowchart illustrating a method 1800 that supports repetition-based transmissions for uplink URLLC in accordance with aspects of the present disclosure. The operations of method 1800 may be implemented by a UE 115 or its components as described herein. For example, the operations of method 1800 may be performed by a communications manager as described with reference to FIGS. 8 through 11. In some examples, a UE may execute a set of instructions to control the functional elements of the UE to perform the functions described below. Additionally, or alternatively, a UE may perform aspects of the functions described below using special-purpose hardware.

At 1805, the UE may identify that a UE is configured for repetition-based transmission of a transport block within a repetition window, the repetition window including a first TTI and subsequent TTIs. The operations of 1805 may be performed according to the methods described herein. In some examples, aspects of the operations of 1805 may be performed by a repetition-based transmission manager as described with reference to FIGS. 8 through 11.

At 1810, the UE may select a repetition window configuration from a set of repetition window configurations. The operations of 1810 may be performed according to the methods described herein. In some examples, aspects of the operations of 1810 may be performed by a repetition window configuration manager as described with reference to FIGS. 8 through 11.

At 1815, the UE may transmit the transport block in an initial transmission within the first TTI of the repetition window, where the repetition window is based on the selected repetition window configuration. The operations of 1815 may be performed according to the methods described herein. In some examples, aspects of the operations of 1815 may be performed by a repetition-based transmission manager as described with reference to FIGS. 8 through 11.

Figure 19:
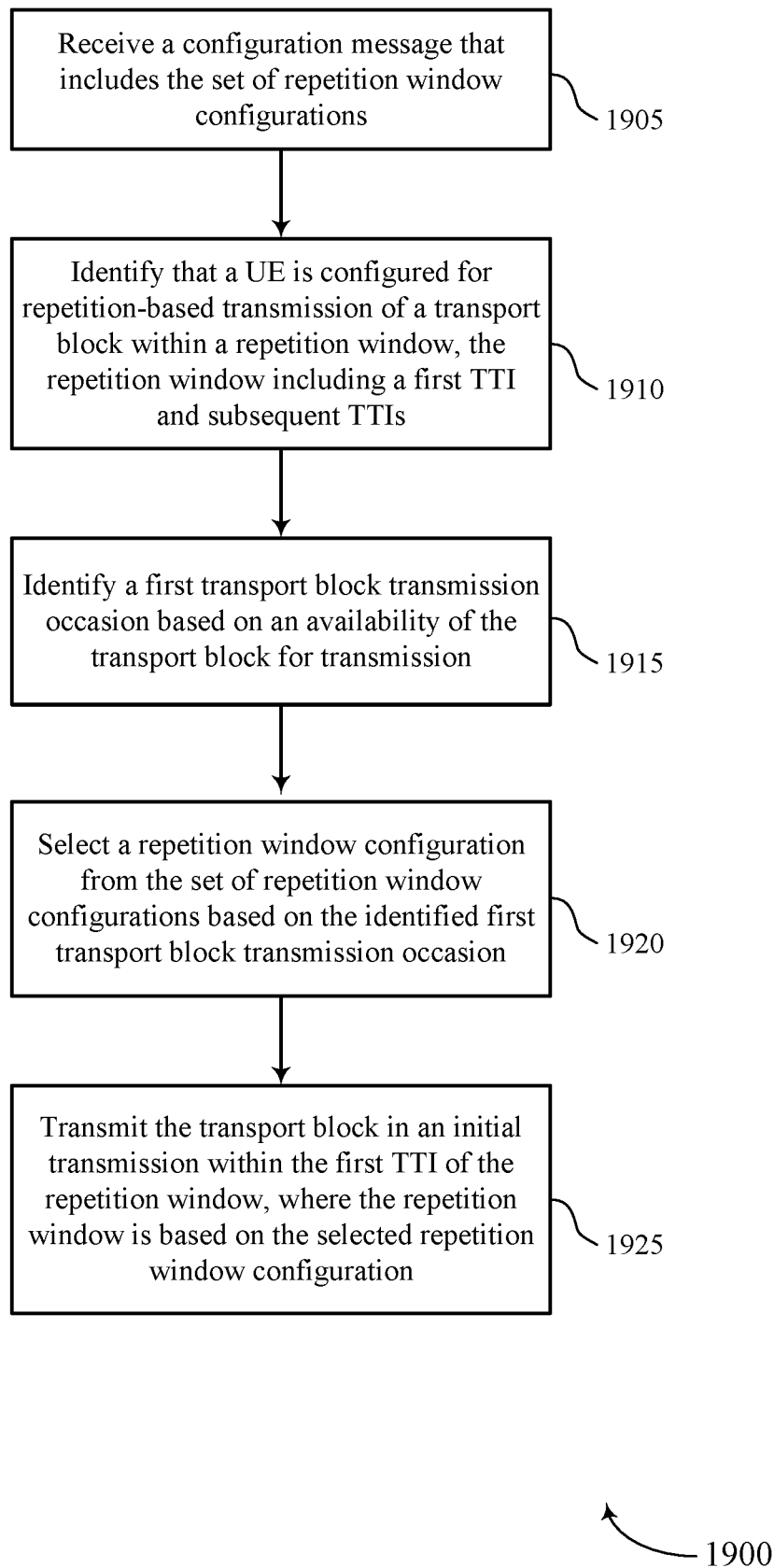

FIG. 19 shows a flowchart illustrating a method 1900 that supports repetition-based transmissions for uplink URLLC in accordance with aspects of the present disclosure. The operations of method 1900 may be implemented by a UE 115 or its components as described herein. For example, the operations of method 1900 may be performed by a communications manager as described with reference to FIGS. 8 through 11. In some examples, a UE may execute a set of instructions to control the functional elements of the UE to perform the functions described below. Additionally, or alternatively, a UE may perform aspects of the functions described below using special-purpose hardware.

At 1905, the UE may receive a configuration message that includes the set of repetition window configurations. The operations of 1905 may be performed according to the methods described herein. In some examples, aspects of the operations of 1905 may be performed by a repetition window configuration manager as described with reference to FIGS. 8 through 11.

At 1910, the UE may identify that the UE is configured for repetition-based transmission of a transport block within a repetition window, the repetition window including a first TTI and subsequent TTIs. The operations of 1910 may be performed according to the methods described herein. In some examples, aspects of the operations of 1910 may be performed by a repetition-based transmission manager as described with reference to FIGS. 8 through 11.

At 1915, the UE may identify a first transport block transmission occasion based on an availability of the transport block for transmission. The operations of 1915 may be performed according to the methods described herein. In some examples, aspects of the operations of 1915 may be performed by a transmission opportunity manager as described with reference to FIGS. 8 through 11.

At 1920, the UE may select a repetition window configuration from the set of repetition window configurations (e.g., from the configuration message) based on the first transport block transmission occasion. The operations of 1920 may be performed according to the methods described herein. In some examples, aspects of the operations of 1920 may be performed by a repetition window configuration manager as described with reference to FIGS. 8 through 11.

At 1925, the UE may transmit the transport block in an initial transmission within the first TTI of the repetition window, where the repetition window is based on the selected repetition window configuration. The operations of 1925 may be performed according to the methods described herein. In some examples, aspects of the operations of 1925 may be performed by a repetition-based transmission manager as described with reference to FIGS. 8 through 11.

Figure 20:
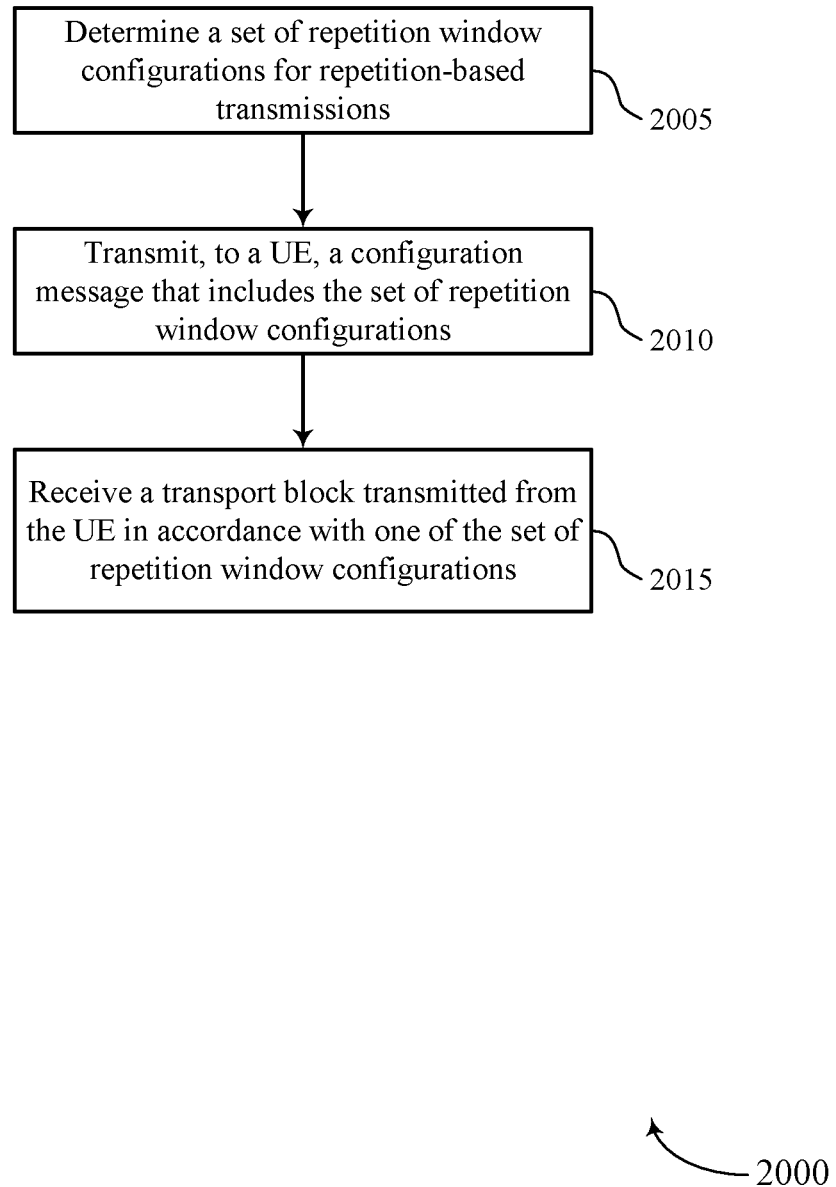

FIG. 20 shows a flowchart illustrating a method 2000 that supports repetition-based transmissions for uplink URLLC in accordance with aspects of the present disclosure. The operations of method 2000 may be implemented by a base station 105 or its components as described herein. For example, the operations of method 2000 may be performed by a communications manager as described with reference to FIGS. 12 through 15. In some examples, a base station may execute a set of instructions to control the functional elements of the base station to perform the functions described below. Additionally, or alternatively, a base station may perform aspects of the functions described below using special-purpose hardware.

At 2005, the base station may determine a set of repetition window configurations for repetition-based transmissions. The operations of 2005 may be performed according to the methods described herein. In some examples, aspects of the operations of 2005 may be performed by a repetition window configuration manager as described with reference to FIGS. 12 through 15.

At 2010, the base station may transmit, to a UE, a configuration message that includes the set of repetition window configurations. The operations of 2010 may be performed according to the methods described herein. In some examples, aspects of the operations of 2010 may be performed by a repetition window configuration manager as described with reference to FIGS. 12 through 15.

At 2015, the base station may receive a transport block transmitted from the UE in accordance with one of the set of repetition window configurations. The operations of 2015 may be performed according to the methods described herein. In some examples, aspects of the operations of 2015 may be performed by a repetition-based transmission manager as described with reference to FIGS. 12 through 15.

Figure 21:
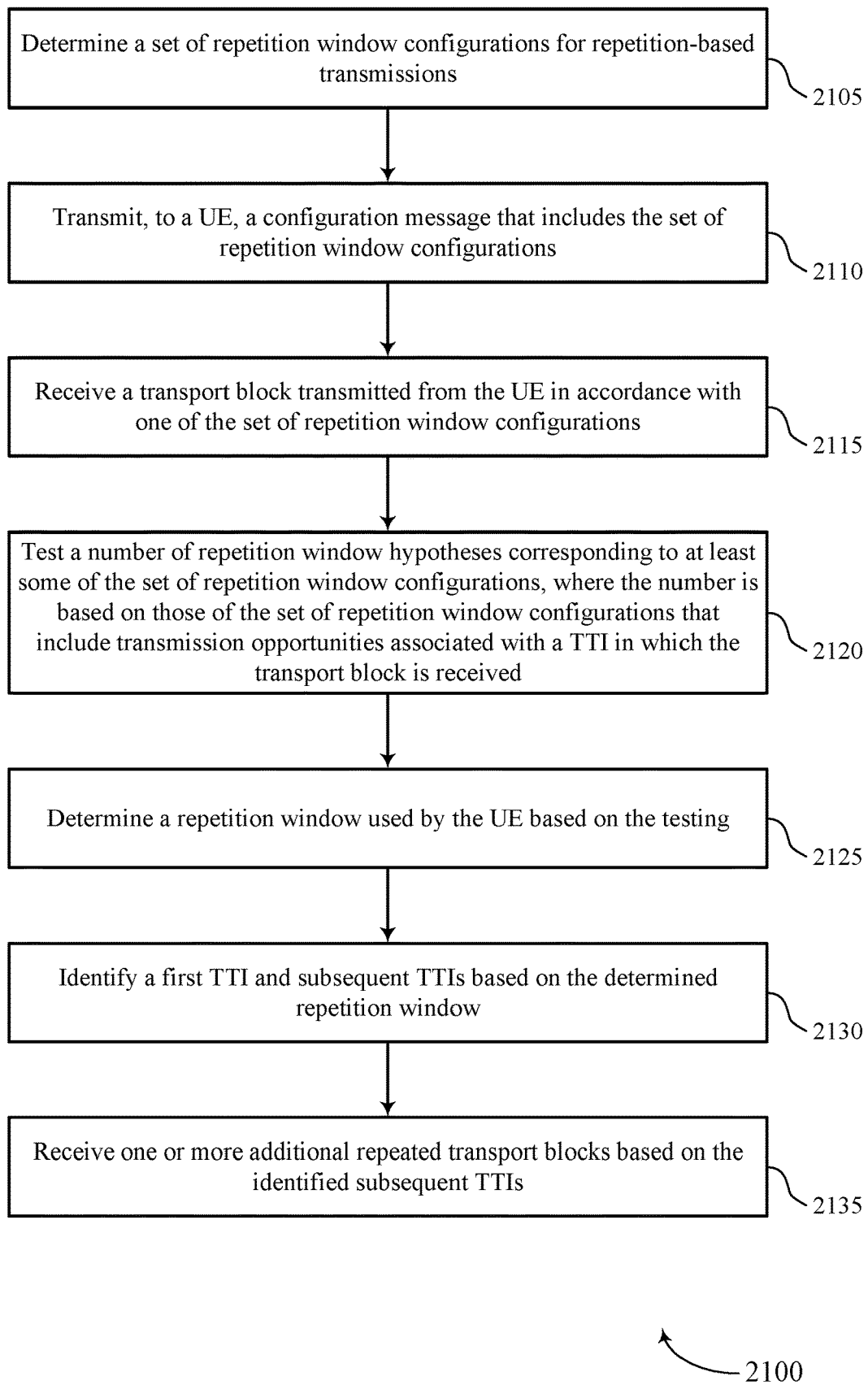

FIG. 21 shows a flowchart illustrating a method 2100 that supports repetition-based transmissions for uplink URLLC in accordance with aspects of the present disclosure. The operations of method 2100 may be implemented by a base station 105 or its components as described herein. For example, the operations of method 2100 may be performed by a communications manager as described with reference to FIGS. 12 through 15. In some examples, a base station may execute a set of instructions to control the functional elements of the base station to perform the functions described below. Additionally, or alternatively, a base station may perform aspects of the functions described below using special-purpose hardware.

At 2105, the base station may determine a set of repetition window configurations for repetition-based transmissions. The operations of 2105 may be performed according to the methods described herein. In some examples, aspects of the operations of 2105 may be performed by a repetition window configuration manager as described with reference to FIGS. 12 through 15.

At 2110, the base station may transmit, to a UE, a configuration message that includes the set of repetition window configurations. The operations of 2110 may be performed according to the methods described herein. In some examples, aspects of the operations of 2110 may be performed by a repetition window configuration manager as described with reference to FIGS. 12 through 15.

At 2115, the base station may receive a transport block transmitted from the UE in accordance with one of the set of repetition window configurations. The operations of 2115 may be performed according to the methods described herein. In some examples, aspects of the operations of 2115 may be performed by a repetition-based transmission manager as described with reference to FIGS. 12 through 15.

At 2120, the base station may test a number of repetition window hypotheses corresponding to at least some of the set of repetition window configurations, where the number is based on those of the set of repetition window configurations that include transmission opportunities associated with a TTI in which the transport block is received. The operations of 2120 may be performed according to the methods described herein. In some examples, aspects of the operations of 2120 may be performed by a repetition window identification manager as described with reference to FIGS. 12 through 15.

At 2125, the base station may determine a repetition window used by the UE based on the testing. The operations of 2125 may be performed according to the methods described herein. In some examples, aspects of the operations of 2125 may be performed by a repetition window identification manager as described with reference to FIGS. 12 through 15.

At 2130, the base station may identify a first TTI and subsequent TTIs based on the determined repetition window. The operations of 2130 may be performed according to the methods described herein. In some examples, aspects of the operations of 2130 may be performed by a repetition window identification manager as described with reference to FIGS. 12 through 15.

At 2135, the base station may receive one or more additional repeated transport blocks based on the identified subsequent TTIs. The operations of 2135 may be performed according to the methods described herein. In some examples, aspects of the operations of 2135 may be performed by a repetition-based transmission manager as described with reference to FIGS. 12 through 15.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project"

(3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
receiving an indication of a plurality of repetition window configurations for a cell based at least in part on the UE being configured for repetition-based transmission of a transport block, wherein each repetition window configuration of the plurality of repetition window configurations is associated with a respective number of transmission repetitions that differs from each other repetition window configuration of the plurality of repetition window configurations;
selecting a repetition window configuration from the plurality of repetition window configurations based at least in part on a comparison of a number of transport block repetitions of the transport block and the respective number of transmission repetitions associated with a respective repetition window configuration of the plurality of repetition window configurations, wherein the number of transport block repetitions of the transport block is based at least in part on a channel quality of the UE being less than a channel quality threshold and on a packet size of the transport block, and wherein the repetition window configuration indicates a first slot and one or more subsequent slots of a repetition window for the transport block; and
transmitting an initial repetition of the transport block within the first slot of the repetition window, wherein the repetition window is based at least in part on the selected repetition window configuration.

2. The method of claim 1, further comprising:
receiving a configuration message that indicates the plurality of repetition window configurations.

3. The method of claim 1, further comprising:
identifying a first transport block transmission occasion based at least in part on an availability of the transport block for transmission, wherein the repetition window configuration is selected based at least in part on the first transport block transmission occasion.

4. The method of claim 3, further comprising:
determining that the repetition window configuration corresponds to a set of slots including the first slot, wherein the first slot is the same as or is closest to a slot in which the transport block is ready for the transmission; and
selecting the repetition window configuration based at least in part on the determining.

5. The method of claim 1, wherein each repetition window configuration of the plurality of repetition window configurations includes at least the respective number of transmission repetitions, a respective repetition window periodicity, a respective repetition window offset, or any combination thereof.

6. The method of claim 5, further comprising:
determining a set of slots corresponding to the repetition window configuration based at least in part on the respective repetition window configuration of the plurality of repetition window configurations, wherein the repetition window configuration is selected based at least in part on the set of slots corresponding to the repetition window configuration.

7. The method of claim 1, wherein selecting the repetition window configuration from the plurality of repetition window configurations comprises:
selecting the repetition window configuration based at least in part on an offset of the repetition window defined by the repetition window configuration.

8. The method of claim 1, wherein a length of the repetition window, in slots, is equal to a periodicity of the repetition window, and wherein the respective number of transmission repetitions associated with the respective repetition window configuration of the plurality of repetition window configurations is equal to the periodicity of the repetition window associated with the respective repetition window configuration.

9. The method of claim 1, wherein each repetition window configuration is associated with a respective resource set, demodulation reference signal (DMRS) pattern, cyclic shift pattern, interleaved frequency division multiple access (iFDMA) pattern, or my combination thereof.

10. A method for wireless communication at a network device, comprising:
transmitting a configuration message indicating a plurality of repetition window configurations for repetition-based transmission for a cell of the network device, each respective repetition window configuration indicating a first slot and subsequent slots in a repetition window, wherein each repetition window configuration of the plurality of repetition window configurations is associated with a respective number of transmission repetitions that differs from each other repetition window configuration of the plurality of repetition window configurations; and
receiving, based at least in part on a number of transport block repetitions of a transport block satisfying the respective number of transmission repetitions for a respective repetition window configuration of the plurality of repetition window configurations, the transport block in accordance with a repetition window configuration of the plurality of repetition window configurations, wherein the number of transport block repetitions of the transport block is based at least in part on a channel quality of a user equipment (UE) being less than a channel quality threshold and on a packet size of the transport block.

11. The method of claim 10, further comprising:
testing, by the network device, a number of repetition window hypotheses associated with the plurality of repetition window configurations, wherein the number of repetition window hypotheses is based at least in part on those of the plurality of repetition window configurations that include transmission opportunities associated with a slot in which the transport block is received.

12. The method of claim 11, further comprising:
determining the repetition window configuration of the plurality of repetition window configurations in which the transport block is received based at least in part on the testing;
identifying the first slot and the subsequent slots based at least in part on the repetition window configuration; and
receiving one or more additional repeated transport blocks based at least in part on the identified subsequent slots.

13. The method of claim 12, wherein the transport block is received in the first slot.

14. The method of claim 10, further comprising:
adjusting a number of the plurality of repetition window configurations indicated in the configuration message based at least in part on a target latency metric satisfying a threshold.

15. The method of claim 10, wherein at least one of the plurality of repetition window configurations is determined based at least in part on a number of transmission repetitions to be included in the repetition-based transmission, a modulation and coding scheme (MCS) of the repetition-based transmission, the packet size of the repetition-based transmission, UE channel conditions, the packet size of the transport block satisfying a packet size threshold, or any combination thereof.

16. The method of claim 10, further comprising:
adjusting a number of the plurality of repetition window configurations indicated in the configuration message based at least in part on the packet size of the repetition-based transmission satisfying a packet size threshold, a modulation and coding scheme (MCS) of the repetition-based transmission satisfying an MCS threshold, a UE channel condition quality satisfying a quality threshold, or any combination thereof.

17. The method of claim 10, wherein determining the plurality of repetition window configurations comprises:
determining, for each of the plurality of repetition window configurations, a number of transport block transmission repetitions, a repetition window periodicity, a repetition window offset, or any combination thereof.

18. The method of claim 10, wherein determining the plurality of repetition window configurations comprises:
determining a respective number of transport block transmission repetitions and a respective repetition window periodicity for the plurality of repetition window configurations; and
determining, for each of the plurality of repetition window configurations, a respective repetition window offset.

19. A user equipment (UE), comprising:
one or more memories storing processor-executable code; and
one or more processors coupled with the one or more memories and individually or collectively operable to execute the code to cause the UE to:
receive an indication of a plurality of repetition window configurations for a cell based at least in part on the UE being configured for repetition-based transmission of a transport block, wherein each repetition window configuration of the plurality of repetition window configurations is associated with a respective number of transmission repetitions that differs from each other repetition window configurate of the plurality of repetition window configurations;
select a repetition window configuration from the plurality of repetition window configurations based at least in part on a comparison of a number of transport block repetitions of the transport block and the respective number of transmission repetitions associated with a respective repetition window configuration of the plurality of repetition window configurations, wherein the number of transport block repetitions is based at least in part on a channel quality of the UE being less than a channel quality threshold and on a packet size of the transport block, and wherein the repetition window configuration indicates a first slot and one or more subsequent slots of a repetition window for the transport block; and
transmit an initial repetition of the transport block within the first slot of the repetition window, wherein the repetition window is based at least in part on the selected repetition window configuration.

20. The UE of claim 19, wherein the one or more processors are individually or collectively further operable to execute the code to cause the UE to:
receive a configuration message that indicates the plurality of repetition window configurations.

21. The UE of claim 19, wherein the one or more processors are individually or collectively further operable to execute the code to cause the UE to:
identify a first transport block transmission occasion based at least in part on an availability of the transport block for transmission, wherein the repetition window configuration is selected based at least in part on the first transport block transmission occasion.

22. The UE of claim 21, wherein the one or more processors are individually or collectively further operable to execute the code to cause the UE to:
determine that the repetition window configuration corresponds to a set of slots including the first slot, wherein the first slot is the same as or is closest to a slot in which the transport block is ready for the transmission; and
select the repetition window configuration based at least in part on the determining.

23. The UE of claim 19, wherein:
each repetition window configuration of the plurality of repetition window configurations includes at least the respective number of transmission repetitions, a respective repetition window periodicity, a respective repetition window offset, or any combination thereof.

24. The UE of claim 23, wherein the one or more processors are individually or collectively further operable to execute the code to cause the UE to:
determine a set of slots corresponding to the repetition window configuration based at least in part on the respective repetition window configuration of the plurality of repetition window configurations, wherein the repetition window configuration is selected based at least in part on the set of slots corresponding to the repetition window configuration.

25. The UE of claim 19, wherein, to select the repetition window configuration from the plurality of repetition window configurations, the one or more processors are individually or collectively further operable to execute the code to cause the UE to:
select the repetition window configuration based at least in part on an offset of the repetition window defined by the repetition window configuration.

26. The UE of claim 19, wherein a length of the repetition window, in slots, is equal to a periodicity of the repetition window, and wherein the respective number of transmission repetitions of the transport block of the respective repetition window configuration of the plurality of repetition window configurations is equal to the periodicity of the repetition window associated with the respective repetition window configuration.

27. The UE of claim 19, wherein each repetition window configuration is associated with a respective resource set, demodulation reference signal (DMRS) pattern, cyclic shift pattern, interleaved frequency division multiple access (iFDMA) pattern, or any combination thereof.

28. A network device, comprising:
one or more memories storing processor-executable code; and
one or more processors coupled with the one or more memories and individually or collectively operable to execute the code to cause the network device to:
transmit an indication of a plurality of repetition window configurations for repetition-based transmission for a cell of the network device, each respective repetition window configuration indicating a first slot and subsequent slots in a repetition window, wherein each repetition window of the plurality of repetition window configurations is associated with a respective number of transmission repetitions that differs from each other repetition window configuration of the plurality of repetition window configurations; and
receive, based at least in part on a number of transport block repetitions of a transport block satisfying the respective number of transmission repetitions for a respective repetition window configuration of the plurality of repetition window configurations, the transport block in accordance with a repetition window configuration of the plurality of repetition window configurations, wherein the number of transport block repetitions is based at least in part on a channel quality of a user equipment (UE) being less than a channel quality threshold and on a packet size of the transport block.

29. The network device of claim 28, wherein the one or more processors are individually or collectively further operable to execute the code to cause the network device to:
test, by the network device, a number of repetition window hypotheses associated with the plurality of repetition window configurations, wherein the number of repetition window hypotheses is based at least in part on those of the plurality of repetition window configurations that include transmission opportunities associated with a slot in which the transport block is received.

30. The network device of claim 29, wherein the one or more processors are individually or collectively further operable to execute the code to cause the network device to:
determine the repetition window configuration of the plurality of repetition window configurations in which the transport block is received based at least in part on the testing;
identify the first slot and the subsequent slots based at least in part on the repetition window configuration; and
receive one or more additional repeated transport blocks based at least in part on the identified subsequent slots.

31. The network device of claim 30, wherein the transport block is received in the first slot.

32. The network device of claim 28, wherein the one or more processors are individually or collectively further operable to execute the code to cause the network device to:
adjust a number of the plurality of repetition window configurations indicated in a configuration message based at least in part on a target latency metric satisfying a threshold.

33. The network device of claim 28, wherein at least one of the plurality of repetition window configurations is determined based at least in part on the number of transport block repetitions to be included in the repetition-based transmission, a modulation and coding scheme (MCS) of the repetition-based transmission, the packet size of the repetition-based transmission, UE channel conditions, the packet size of the transport block satisfying a packet size threshold, or any combination thereof.

34. The network device of claim 28, wherein the one or more processors are individually or collectively further operable to execute the code to cause the network device to:
adjust a number of the plurality of repetition window configurations indicated in a configuration message based at least in part on the packet size of the repetition-based transmission satisfying a packet size threshold, a modulation and coding scheme (MCS) of the repetition-based transmission satisfying an MCS threshold, a UE channel condition quality satisfying a quality threshold, or any combination thereof.

35. The network device of claim 28, wherein to determine the plurality of repetition window configurations, the one or more processors are individually or collectively further operable to execute the code to cause the network device to:
determine, for each of the plurality of repetition window configurations, a number of transport block transmission repetitions, a repetition window periodicity, a repetition window offset, or any combination thereof.

36. The network device of claim 28, wherein to determine the plurality of repetition window configurations, the one or more processors are individually or collectively further operable to execute the code to cause the network device to:
determine a respective number of transport block transmission repetitions and a repetition window periodicity for the plurality of repetition window configurations; and
determine, for each of the plurality of repetition window configurations, a respective repetition window offset.

37. A user equipment (UE), comprising:
means for receiving an indication of a plurality of repetition window configurations for a cell based at least in part on the UE being configured for repetition-based transmission of a transport block, wherein each repetition window configuration of the plurality of repetition window configurations is associated with a respective number of transmission repetitions that differs from each other repetition window configuration of the plurality of repetition window configurations;
means for selecting a repetition window configuration from the plurality of repetition window configurations based at least in part on a comparison of a number of transport block repetitions of the transport block and the respective number of transmission repetitions associated with a respective repetition window configuration of the plurality of repetition window configurations, wherein the number of transport block repetitions of the transport block is based at least in part on a channel quality of the UE being less than a channel quality threshold and on a packet size of the transport block, and wherein the repetition window configuration indicates a first slot and one or more subsequent slots of a repetition window for the transport block; and means for transmitting an initial repetition of the transport block within the first slot of the repetition window, wherein the repetition window is based at least in part on the selected repetition window configuration.

38. A network device, comprising:

means for transmitting a configuration message indicating a plurality of repetition window configurations for repetition-based transmission for a cell of the network device, each respective repetition window configuration indicating a first slot and subsequent slots in a repetition window, wherein each repetition window configuration of the plurality of repetition window configurations is associated with a respective number of transmission repetitions that differs from each other repetition window configuration of the plurality of repetition window configurations; and means for receiving, based at least in part on a number of transport block repetitions of a transport block satisfying the respective number of transmission repetitions for a respective repetition window configuration of the plurality of repetition window configurations, the transport block in accordance with a repetition window configuration of the plurality of repetition window configurations, wherein the number of transport block repetitions of the transport block is based at least in part on a channel quality of a user equipment (UE) being less than a channel quality threshold and on a packet size of the transport block.

39. A non-transitory computer-readable medium storing code for wireless communication at a user equipment (UE), the code comprising instructions executable by a processor to:

receive an indication of a plurality of repetition window configurations for a cell based at least in part on the UE being configured for repetition-based transmission of a transport block, wherein each repetition window configuration of the plurality of repetition window configurations is associated with a respective number of transmission repetitions that differs from each other repetition window configuration of the plurality of repetition window configurations;

select a repetition window configuration from the plurality of repetition window configurations based at least in part on a comparison of a number of transport block repetitions of the transport block and the respective number of transmission repetitions associated with a respective repetition window configuration of the plurality of repetition window configurations, wherein the number of transport block repetitions of the transport block is based at least in part on a channel quality of the UE being less than a channel quality threshold and on a packet size of the transport block, and wherein the repetition window configuration indicates a first slot and one or more subsequent slots of a repetition window for the transport block; and transmit an initial repetition of the transport block within the first slot of the repetition window, wherein the repetition window is based at least in part on the selected repetition window configuration.

40. A non-transitory computer-readable medium storing code for wireless communication at a network device, the code comprising instructions executable by a processor to:

transmit a configuration message indicating a plurality of repetition window configurations for repetition-based transmission for a cell of the network device, each respective repetition window configuration indicating a first slot and subsequent slots in a repetition window, wherein each repetition window configuration of the plurality of repetition window configurations is associated with a respective number of transmission repetitions that differs from each other repetition window configuration of the plurality of repetition window configurations; and receive, based at least in part on a number of transport block repetitions of a transport block satisfying the respective number of transmission repetitions for a respective repetition window configuration of the plurality of repetition window configurations, the transport block in accordance with a repetition window configuration of the plurality of repetition window configurations, wherein the number of transport block repetitions of the transport block is based at least in part on a channel quality of a user equipment (UE) being less than a channel quality threshold and on a packet size of the transport block.

41. The method of claim 1, wherein the number of transport block repetitions of the transport block is based at least in part on the packet size of the transport block satisfying a packet size threshold.

42. The UE of claim 19, wherein the number of transport block repetitions of the transport block is based at least in part on the packet size of the transport block satisfying a packet size threshold.

* * * * *